(12) United States Patent
Shiba

(10) Patent No.: US 6,366,550 B1
(45) Date of Patent: Apr. 2, 2002

(54) DISC CHANGER

(75) Inventor: Katsuhiro Shiba, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/454,587

(22) Filed: Dec. 7, 1999

(30) Foreign Application Priority Data

Feb. 26, 1999 (JP) ........................................... 11-050948

(51) Int. Cl.⁷ ............................................. G11B 17/04
(52) U.S. Cl. ..................................................... 369/178
(58) Field of Search ................................ 369/178, 191, 369/192, 34, 36, 75.1–75.2, 77.1, 77.2

(56) References Cited

U.S. PATENT DOCUMENTS 5,886,961 A * 3/1999 Yamashita et al. ............ 369/34
6,205,093 B1 * 3/2001 Abbott et al. .................. 369/34
6,208,612 B1 * 3/2001 Miller ......................... 369/178
6,236,626 B1 * 5/2001 Nagai ........................... 369/34

* cited by examiner

Primary Examiner—Allen Cao
(74) Attorney, Agent, or Firm—Young & Thompson

(57) ABSTRACT

A disc changer has at least one slot in which any one of different kinds of disc magazines can be stored. The disc changer includes a first device for identifying a type and an identification number of the disc magazine, a second device for detecting existence of a disc in the disc magazine, a third device for reading information recorded on the disc, which is stored in the magazine and a fourth device for storing a data table, which includes the information on the type and the identification number of the disc magazine and on the existence of the disc in the disc magazine.

3 Claims, 22 Drawing Sheets

FRONT ⟵⟶ REAR

FRONT ←→ REAR

DISC CHANGER

BACKGROUND OF THE INVENTION

1. Field of the Invention

The present invention relates to a disc changer, which permits to identify the type of a disc magazine loaded therein to setup rapidly a system without carrying out an unnecessary identification process.

2. Description of the Related Art

In the conventional prior art, a disc magazine, which permits to store a plurality of discs in a disc changer, has no reliable locking mechanism. For example, the conventional disc magazine merely has s leaf spring by which the disc can be held.

There is a possibility that the disc may come down from the disc magazine, when the disc magazine is in the off-line condition, i.e., it is unloaded from the disc changer, and a strong impact force is applied to the disc magazine. The exchanging operation of the disc can easily be carried out in a condition in which the disc magazine is unloaded from the disc changer.

However, if once the coming down or the exchange of the disc occurs, it is necessary to reassemble a data base by detecting the existence of the respective discs in the disc magazine, reproducing partially the information recorded on the disc, and carrying out the other steps, in condition that the disc magazine is reloaded in the disc changer.

The reassembly of the database requires much time. The required time becomes longer, according as the number of discs to be stored in the disc magazine increases. In case many discs exist, an extremely long period of time is required in order to start a system operation.

SUMMARY OF THE INVENTION

An object of the present invention is therefore to provide a disc changer, which permits to reduce the required time in order to start a system operation.

In order to attain the aforementioned object, a disc changer of the present invention, which has at least one slot in which any one of different kinds of disc magazines can be stored, comprises:

a first device for identifying a type and an identification number of said disc magazines;

a second device for detecting existence of a disc in each of said disc magazines;

a third device for reading information recorded on said disc, which is stored in each of said magazines; and a fourth device for storing a data table, which includes the information on the type and the identification number of said disc magazines and on the existence of said disc in each of said disc magazine.

The above-mentioned different kinds of disc magazines may comprise a lock-type disc magazine in which the disc cannot be lodged or dislodged outside the disc changer and a normal-type disc magazine in which the disc can be lodged or dislodged outside the disc changer when the normal-type disc magazine is in an unlocking state.

The above-mentioned first device may comprise (1) a control unit being capable of achieving a setup operation for the disc changer and (2) a memory provided in each of said disc magazines; the above-mentioned second device and said third device may comprise a plurality of disc driving devices for the disc in each of said disc magazines; and the above-mentioned fourth device may comprise a memory provided in the disc changer.

Each of the above-mentioned disc driving devices may comprise a pickup, a spindle motor, a spindle driver, a laser drive circuit, a power control circuit, an encoder, a reproduction amplifier, a decoder, a processor (CPU), a reference clock signal generator for generating a base clock signal for rotation control, a prepit signal decoder, a phase comparator for generating a rotation control signal, a recording clock signal generator and an interface for interchanging data relative to a external host computer.

The above-mentioned first device may comprise (1) a control unit being capable of achieving a setup operation for the disc changer and (2) a memory provided in each of said disc magazines; the above-mentioned third device may comprise a plurality of disc driving devices for the disc in each of said disc magazines; the above-mentioned second device may comprise a disc transferring device for transferring the disc between said disc magazines and said disc driving devices; and the above-mentioned fourth device may comprise a memory provided in the disc changer.

DETAILED DESCRIPTION OF THE PREFERRED EMBODIMENTS

Now, embodiments of a disc changer of the present invention will be described in detail below with reference to the accompanying drawings.

Figure 1:
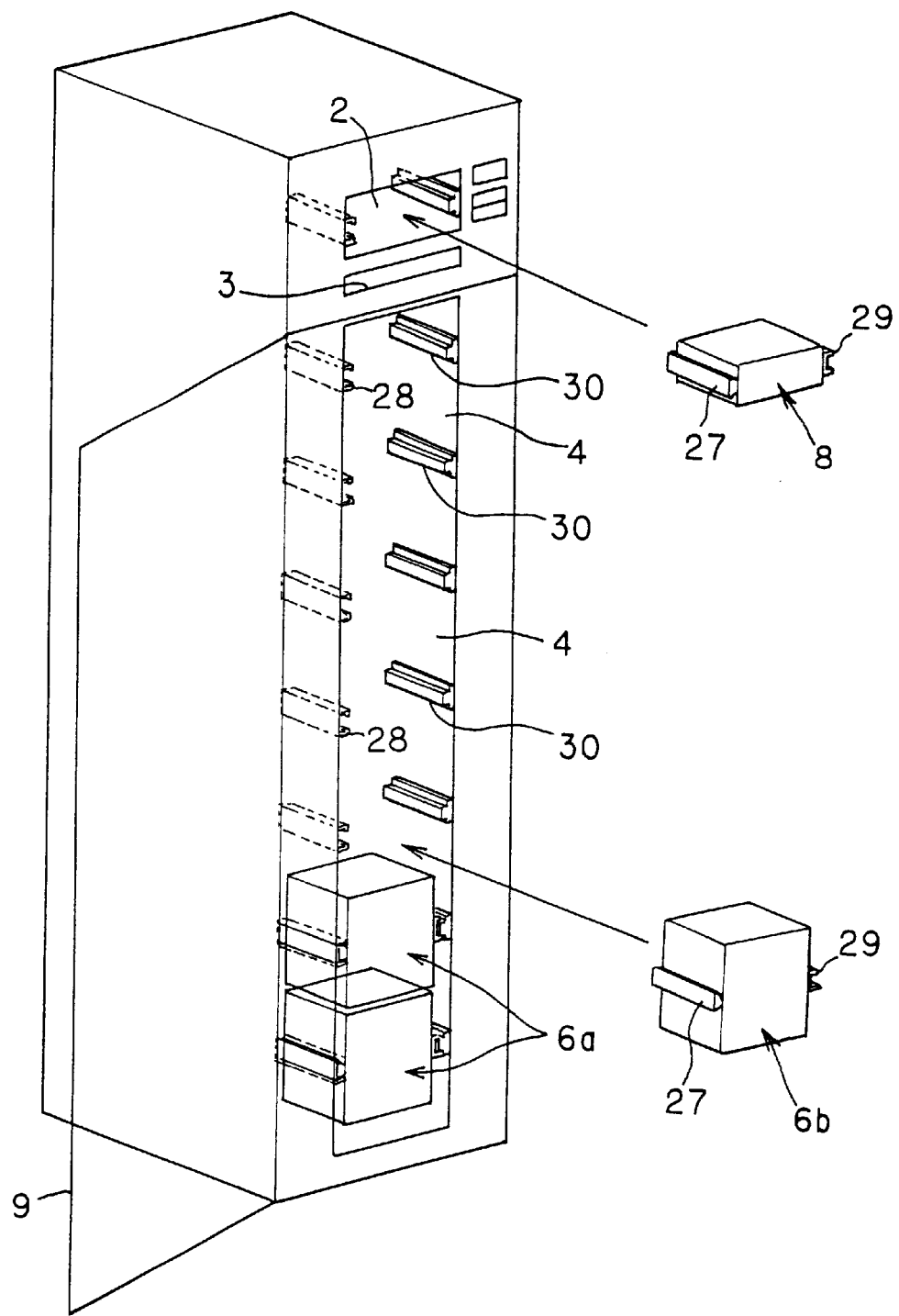
FIG. 1 is a perspective view of a disc changer of an embodiment of the present invention, as seen from its front side.
Figure 2:
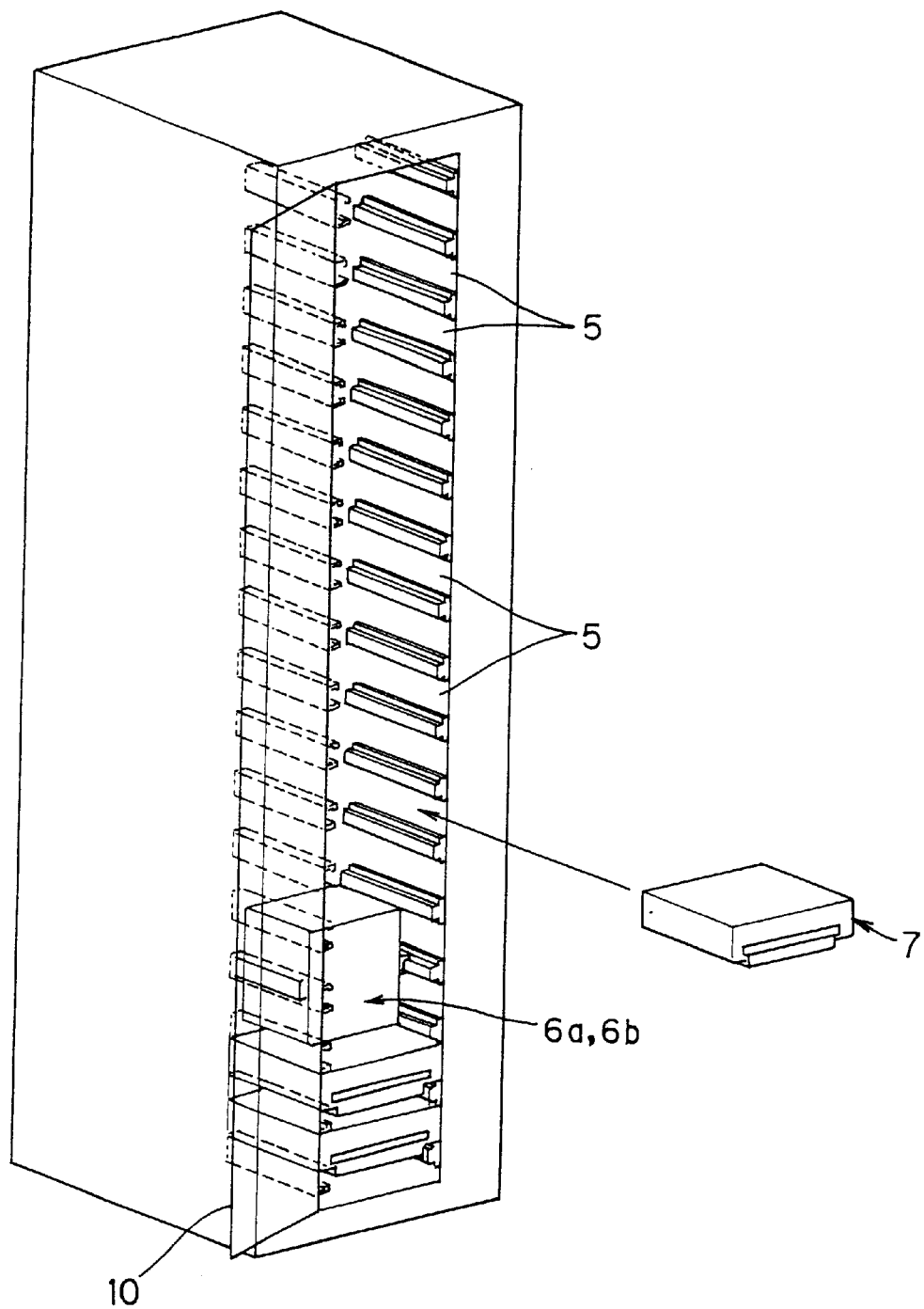
FIG. 2 is a perspective view of the disc changer as shown in FIG. 1, as seen from its rear side.

As shown in FIGS. 1 and 2, a disc changer, which can make an automatic exchange of a disc 1 (see FIG. 3), is provided at its front portion with a single slot 2 for a hyper magazine, which is capable of lodging twenty discs, with a single mail slot 3 and with seven slots 4 for disc magazines, each of which is capable of lodging fifty discs. The disc changer is provided with at its rear portion with common slots 5 for the disc magazines, each of which is capable of lodging fifty discs and disc driving devices for CD-ROM, CD-R, DVD-ROM, DVD-R and the like. The six disc magazines, each of which is capable of lodging the fifty discs, can be loaded in the common slots 5 at the maximum on the one hand. The sixteen disc driving devices 7 can be loaded in the common slots 5 at the maximum on the other hand.

The disc changer is provided in its inside a disc transferring device (not shown). The disc 1 can be moved between the disc magazines 6, 8 and the disc driving devices 7 by means of the disc transferring device.

The disc changer is provided at its front and rear portions with doors 9, 10, respectively, which can be opened only when a power circuit is on. The hyper magazine 8, which is capable of lodging the twenty discs, can be loaded in the slot 2 by means of a motor driving mechanism and a magazine can also be loaded in the mail slot 3 by means of the motor driving mechanism. Accordingly, they can be loaded or unloaded only when the power circuit is on.

In the present invention, the disc magazines 6, 8 has locking devices for preventing the disc 1 from coming off the disc magazines 6, 8. There are prepared two kinds of disc magazine 6a, 6b having the locking devices, which are different from each other. One of them is a normal-type disc magazine as shown in FIGS. 3 to 10, in which the disc 1 can be lodged or dislodged outside the disc changer when the magazine is in an unlocking state. The other is a lock-type disc magazine as shown in FIGS. 11 to 14, in which the disc 1 cannot be lodged or dislodged outside the disc changer.

Figure 21:
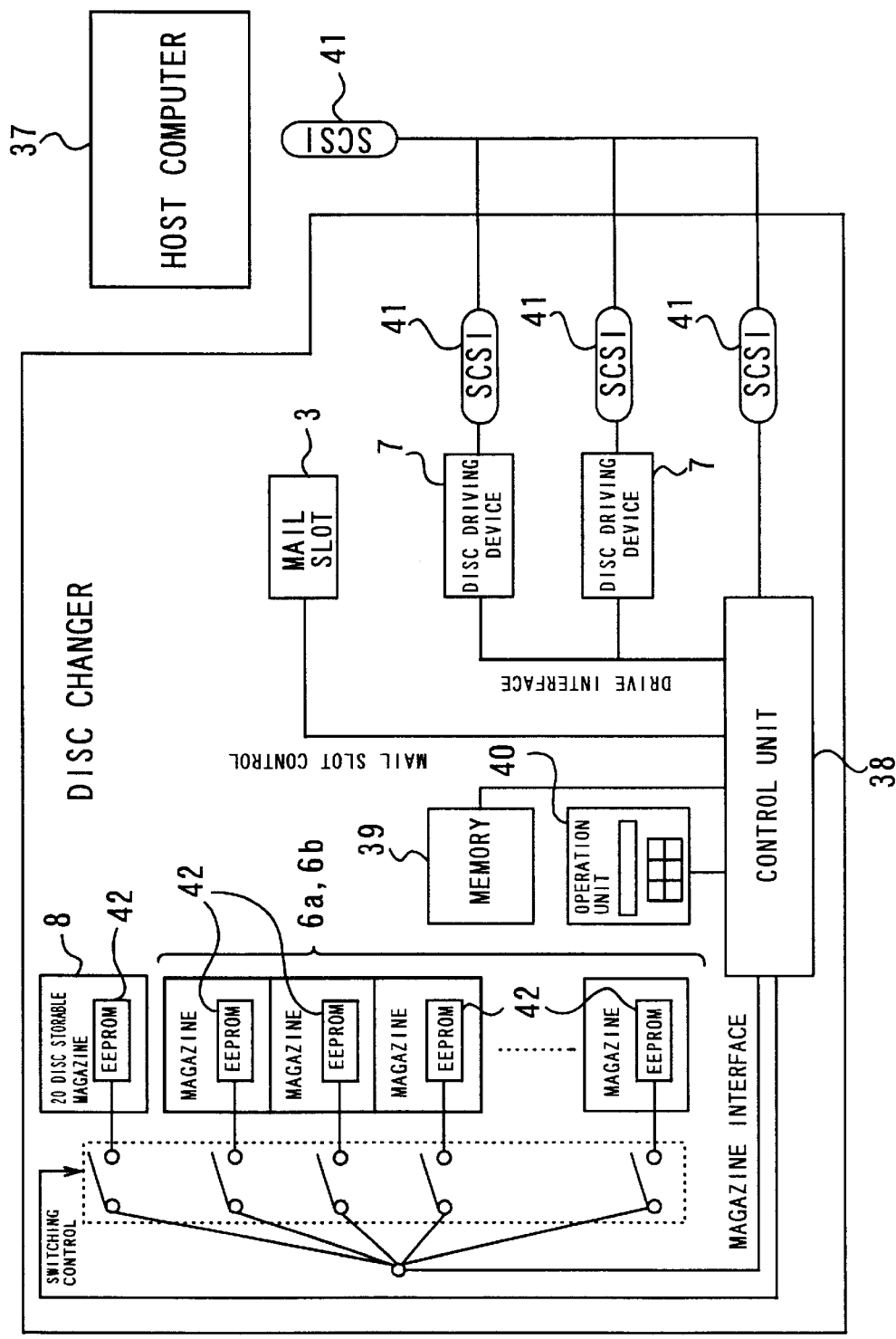
FIG. 21 is a block diagram illustrating a system for the disc changer.

Each of the disc magazines 6a, 6b is provided with a memory 42 (see FIG. 21). The type, i.e., the lock-type or the normal-type of the disc magazine 6a or 6b has been written in the memory 42.

Now, description of the normal-type disc magazine 6a will be given with reference to FIGS. 3–10, and 15–18.

As shown in FIGS. 3–6, a housing of the normal-type disc magazine 6a has a rear wall 11 and the opposite side-walls 12 and 13, which locate on three sides. The housing has in its inside a disc rack 14 mounted thereto, which is provided with a plurality of rack grooves 14a. In this embodiment of the present invention, there are formed fifty rack grooves 14a in any one of which the disc 1 can be slidably inserted.

A disc holder 15 corresponding to each of the rack grooves 14a is provided in a space between the one side-wall 12 and the disc rack 14. The disc holder 15 is an integral formed body of synthetic resin, which has a slender piece 15b and an abutting piece 15a formed at the tip end of the abutting piece 15a so as to be capable of coming into contact with the edge of the disc 1. The slender piece 15b of the disc holder 15b is fixed to the disc rack 14. The disc holder 15 comes into contact with a leaf spring 16. The abutting piece 15a of the disc holder 15 comes into contact with the edge of the disc 1 by a resilient force given by the leaf spring 16 so that the disc 1 is supported in the rack groove 14a by the resilient force. When the disc 1 goes in or out of the rack groove 14a by means of the disc transferring device (not shown), the leaf spring 16 and a part of the slender piece 15b are elastically deformed to permit the disc 1 to pass through.

The disc holder 15 is provided with the locking device by which the disc holder 15 can be put in a locking state or an unlocking state. In the locking state, the disc 1 cannot come off the rack groove 14a by inhibiting the deformation of the disc holder 15. In the unlocking state, the disc can come off the rack groove 14a by permitting the deformation of the disc holder 15.

The locking device has a locking member 17 disposed on the inner surface side of the one side-wall 12 and a release knob 18 disposed on the outer surface side of the side-wall 12.

Figure 3:
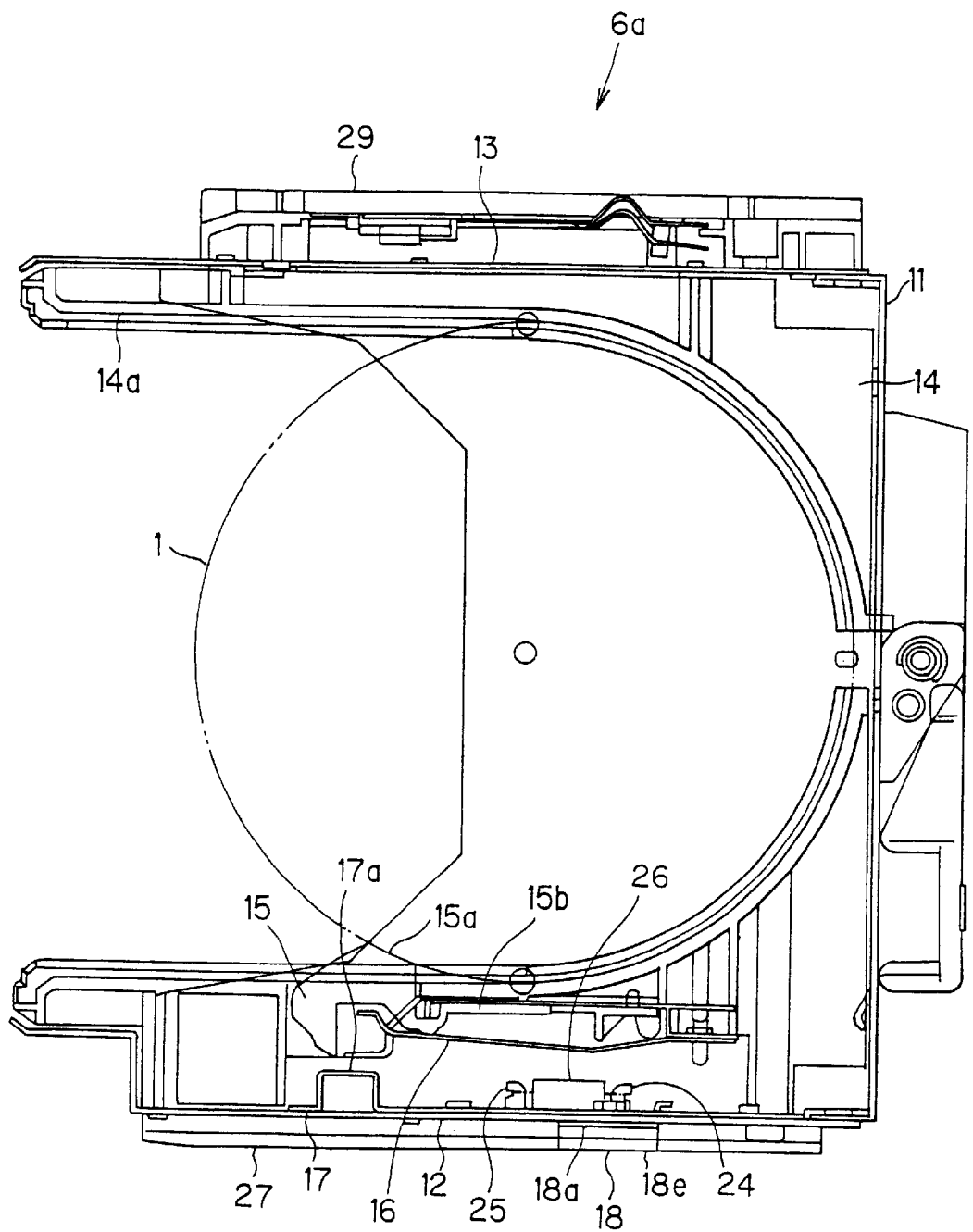
FIG. 3 is a plan view illustrating a normal-type disc magazine, which is in the locking state outside the disc changer.
Figure 4:
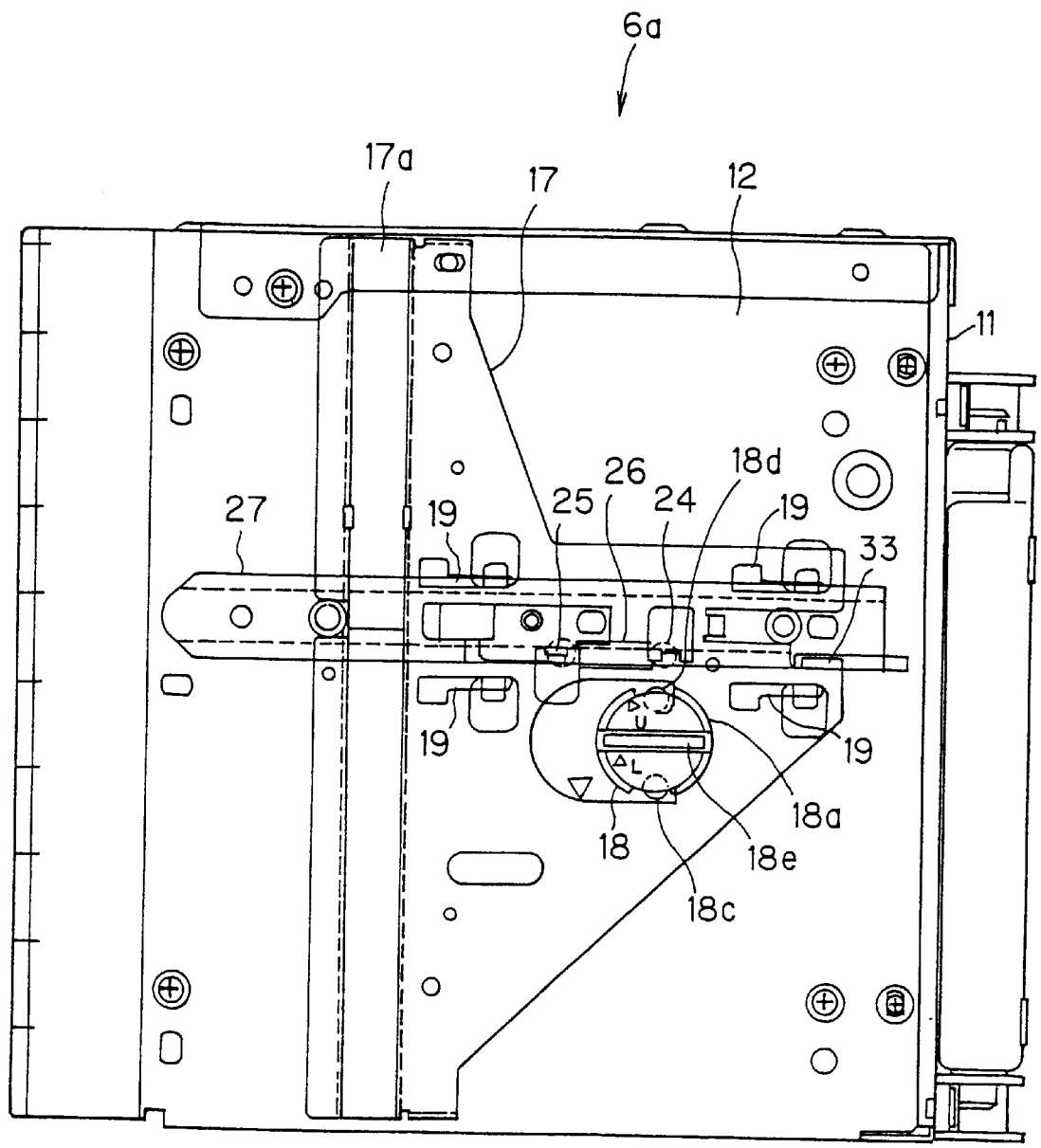
FIG. 4 is a front view of the disc magazine as shown in FIG. 3.
Figure 5:
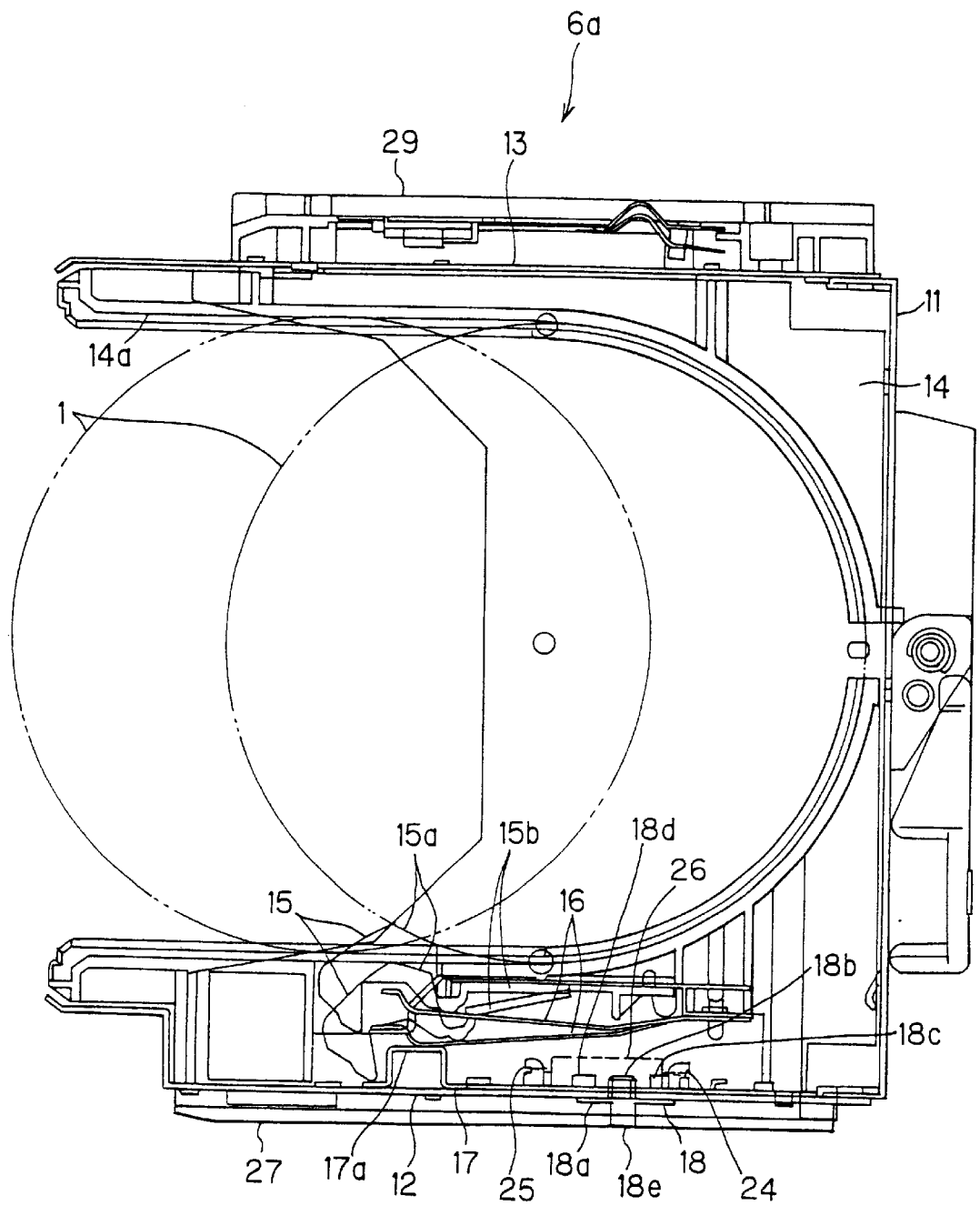
FIG. 5 is a plan view illustrating the normal-type disc magazine, which is in the unlocking state outside the disc changer.
Figure 6:
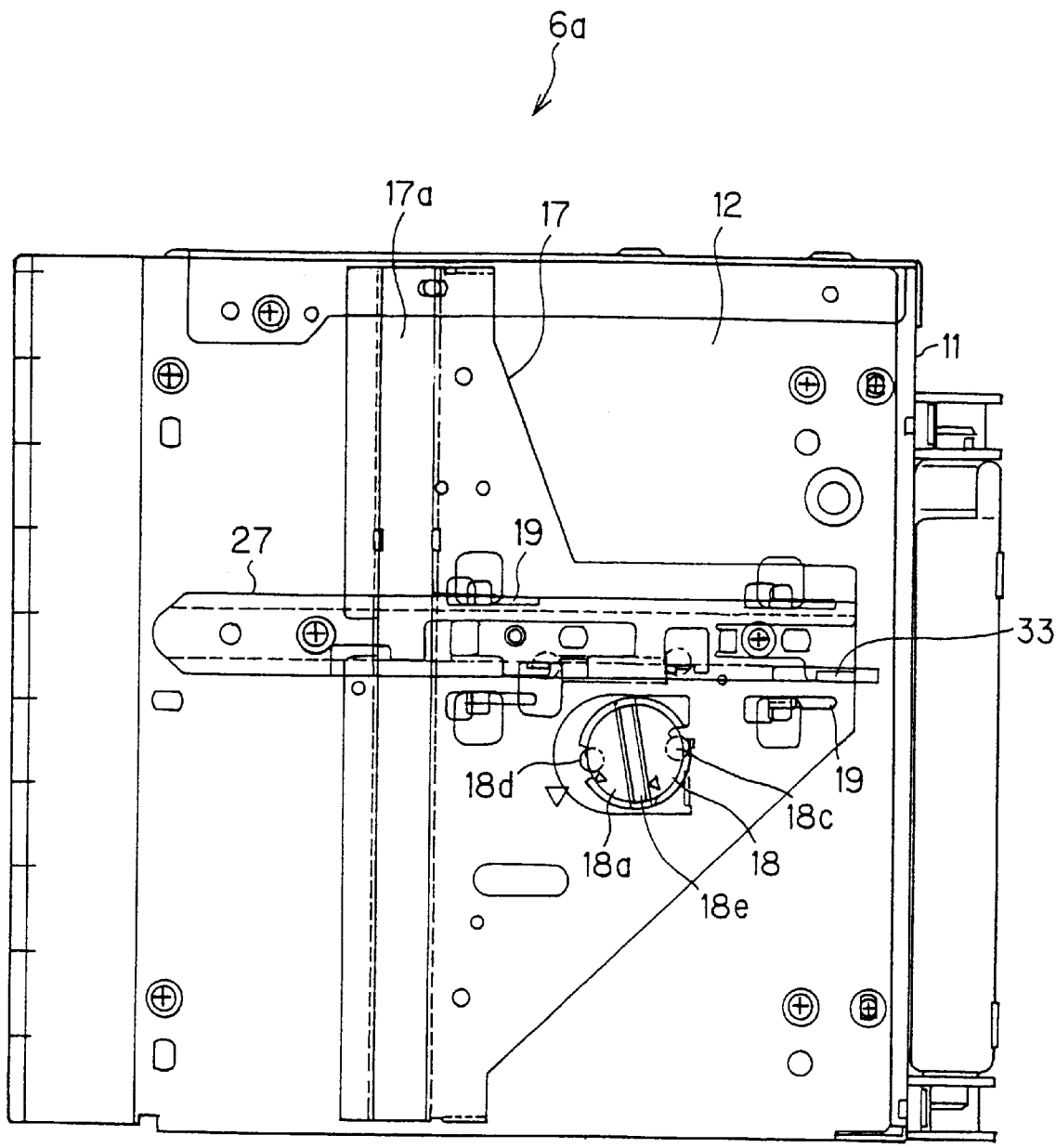
FIG. 6 is a front view of the disc magazine as shown in FIG. 5.
Figure 15:
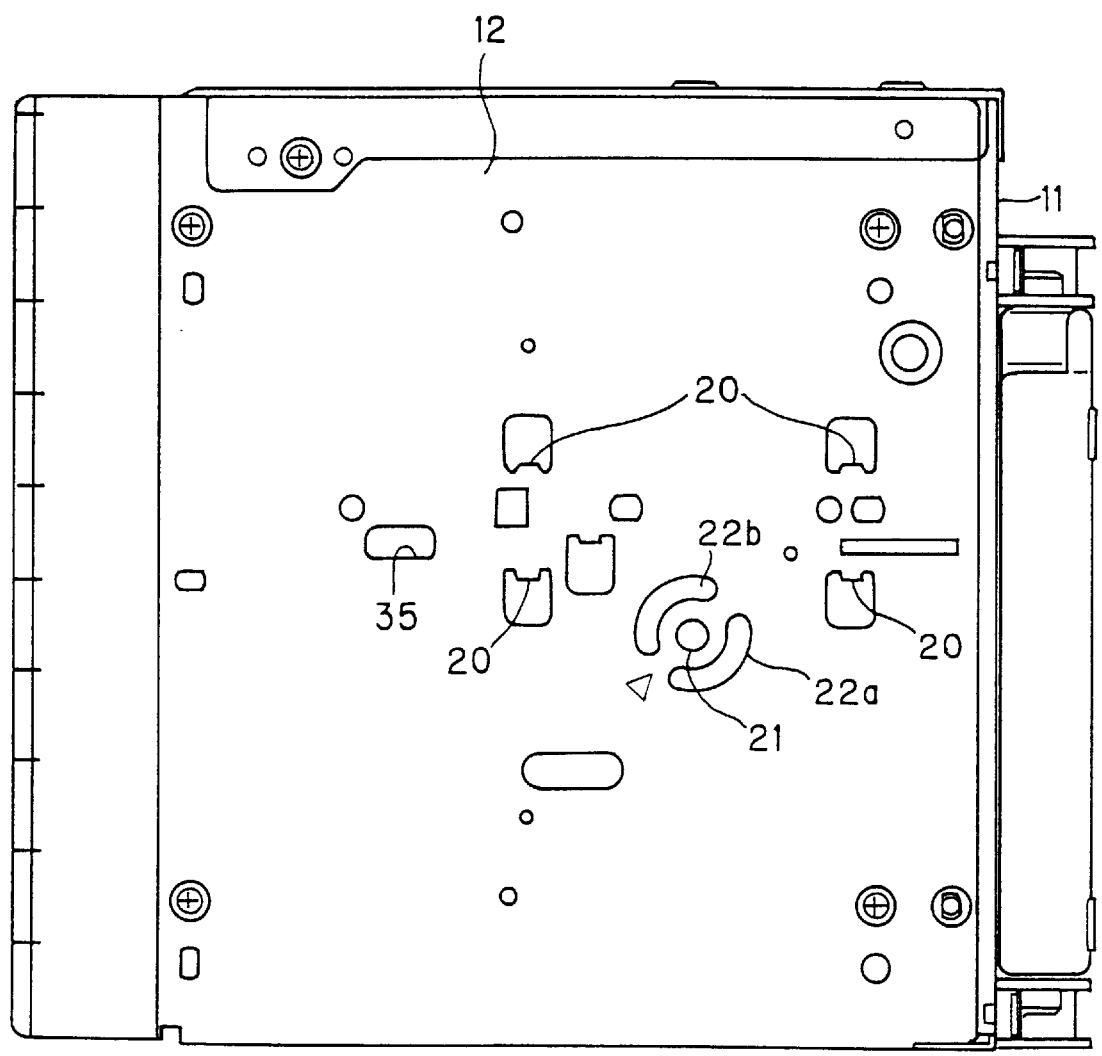
FIG. 15 is a front view of a side wall of the normal-type disc magazine.
Figure 16:
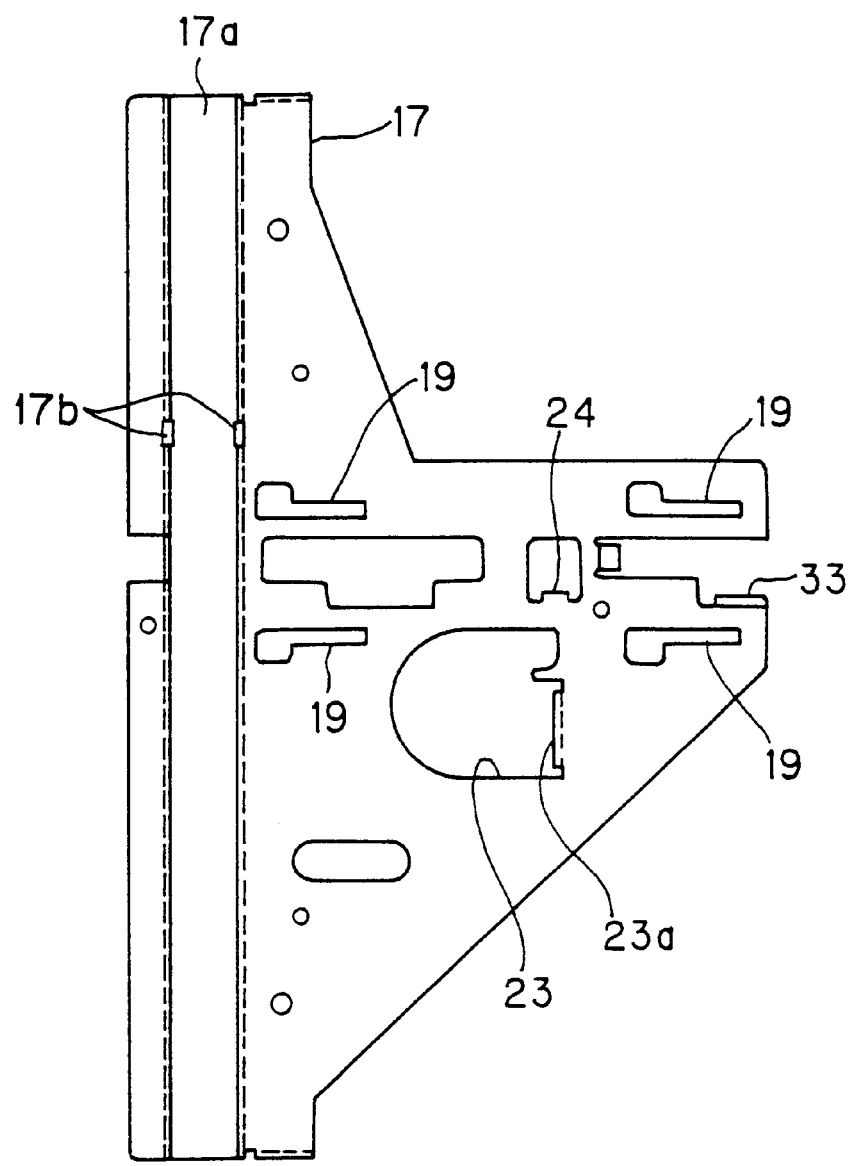
FIG. 16 is a front view of a locking member of the normal-type disc magazine.

The locking member 17 is formed of a plate-shaped material as shown in FIG. 16. The locking member 17 has a projection portion 17a, which corresponds to the abutting pieces 15a of all the disc holders 15. The locking member 17 has slits 19 formed thereon so as to extend in the longitudinal direction of the locking member 17. Projections 20 formed on the side-wall 12 as shown in FIG. 15 are inserted into the above-mentioned slits 19. The guidance of the projections 20 by the slits restricts the stroke of the locking member 17 in its sliding motion in the longitudinal direction along the inner surface of the side-wall 12. As a result, the locking member 17 can be put in the locking position as shown in FIGS. 3 and 4 or the unlocking position as shown in FIGS. 5 and 6. When the locking member 17 is put in the locking position, its projection portion 17a locates behind the abutting piece 15a of the disc holder 15 so as to inhibit the disc holder 15 from being deformed. As a result, all the discs 1 cannot come off the disc rack 14. When the locking member 17 is put in the unlocking position, its projection portion 17a locates away from the abutting pieces 15a of the disc holder 15 so as to permit the disc holder 15 to be deformed. As a result, the respective disc 1 can goes in or out of the disc rack 14.

The release knob 18 has a disc-shaped body 18a, which is placed on the side-wall 12 from the outside thereof as shown in FIGS. 4 and 6. A shaft 18b projects from the central portion of the inner surface of the disc-shaped body 18a. Two pins 18c, 18d project from the inner surface of the disc-shaped body 18a so that the above-mentioned shaft 18b locates between the two pins 18c, 18d. The shaft 18b is inserted into a shaft hole 21, which is formed on the side-wall 12, as shown in FIG. 15. The pins 18c, 18d are fitted into two arcuate holes 22a, 22b formed on the portion, respectively, which surrounds the shaft hole 21. The arcuate holes 22a, 22b have a central angle of about 90 degrees and the disc-shaped body 18a can also turn within the range of 90 degrees so that the pins 18c, 18d can locate in any position between the respective ends of the arcuate holes 22a, 22b. One end of each of the arcuate holes 22a, 22b corresponds to the locking position and the other end thereof corresponds to the unlocking position. The disc-shaped body 18a has on its outer surface an elongated projection 18e, a longitudinal direction of which is identical with the horizontal diametric line when the disc-shaped body 18a is in the locking position.

The pins 18c, 18d of the release knob 18 pass through the arcuate holes 22a, 22b of the side-wall 12 toward the locking member 17. The locking member 17 has a cut-out opening 23 including the region in which the pins 18c, 18d of the release knob 18 move in the turning motion of the release knob 18, as shown in FIG. 16. An abutting edge 23a is formed on the edge portion of the locking member 17, which defines the above-mentioned opening 23, so as to correspond to the above-mentioned locking position. The abutting edge 23a can come into contact with the pin 18c. The resilient force give by a spring 26 spreading between an engaging piece 24 of the locking member 17 and an engaging piece 25 formed on the side-wall 12 so as to maintain the locking member 17 in the locking position as shown in FIG. 15 is always applied to the locking member 17. As a result, the release knob 18 can selectively be in the locking position as shown in FIGS. 3 and 4 or the unlocking position as shown in FIGS. 5 and 6 through a switching operation. Tension given by the spring 26 puts the release knob 18 in any one of these positions. Accordingly, the locking member 17 puts the disc holder 15 in the locking or unlocking state.

Figure 17:
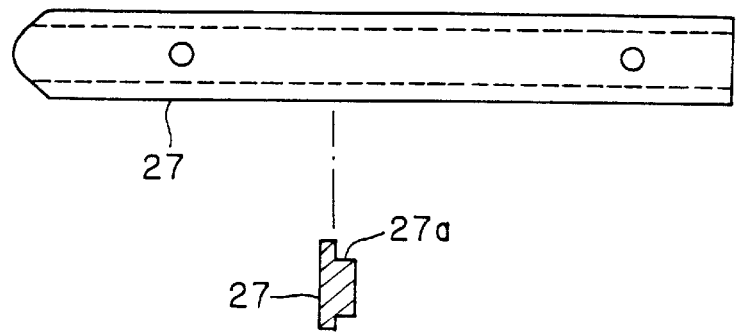
FIG. 17 is a front view of a slider of the normal-type disc magazine.
Figure 18:
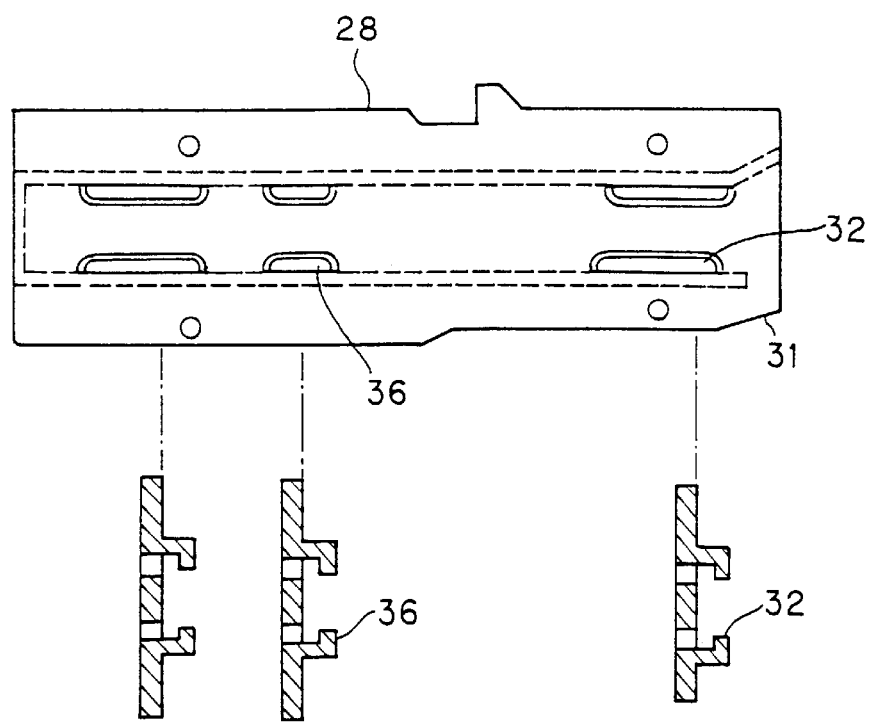
FIG. 18 is a front view of a guide rail of the disc changer.

A slider 27 as shown in FIG. 17 is fixed on the outer surface of the left-hand side wall 12 of the housing. A guide rail 28 as shown in FIG. 18 is mounted in the inside of the disc changer, so as to correspond to the above-mentioned slider 27. The other slider 29 is fixed on the outer surface of the right-hand side wall 13 of the housing. The other guide rail 30 as shown in FIG. 1 is mounted in the inside of the disc changer, so as to correspond to the above-mentioned other slider 29. According to such a structure, the normal-type disc magazine 6a can be guided by the right and left-hand guide rails 28, 30 so as to be loaded into the disc changer or unloaded therefrom.

Figure 7:
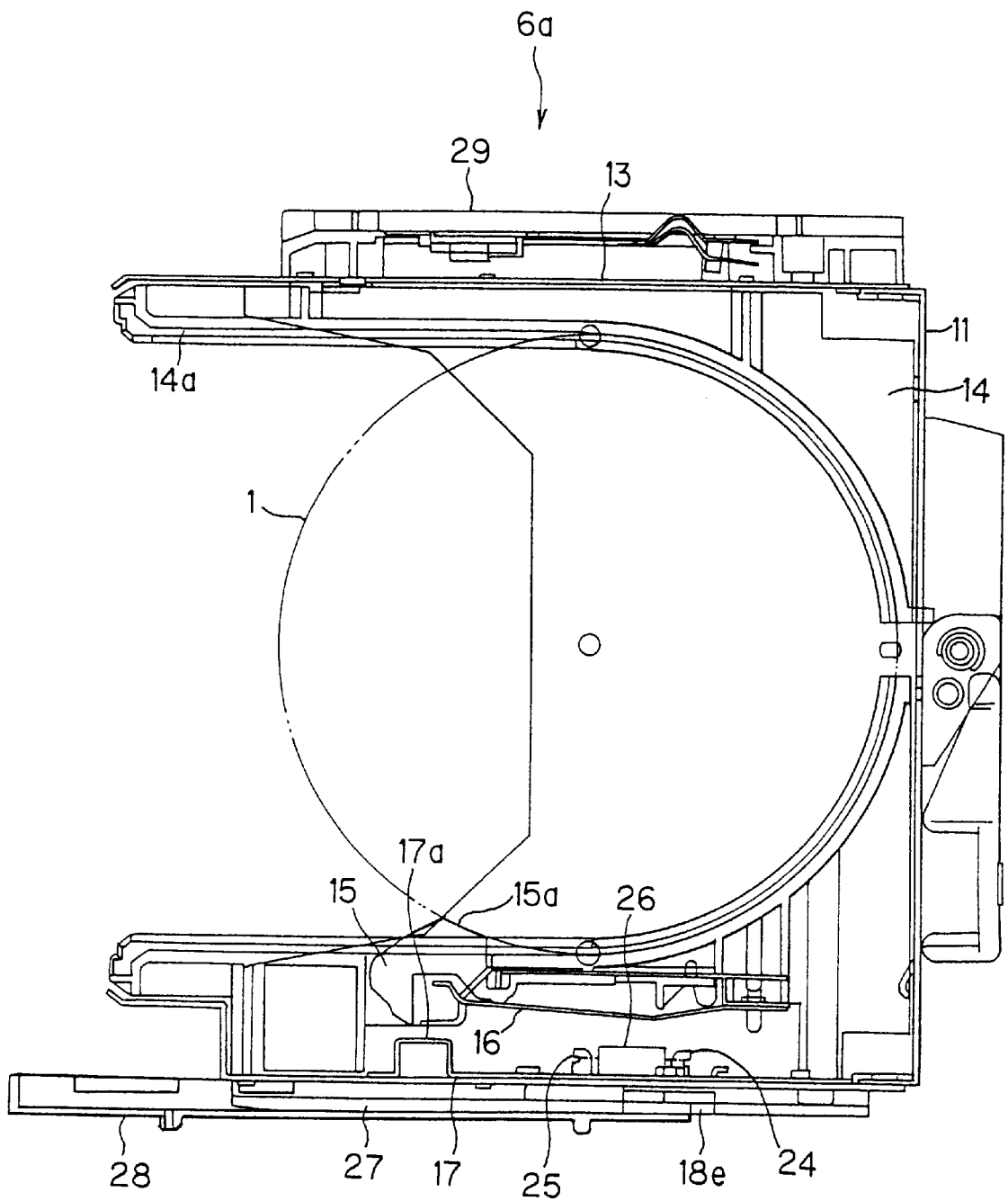
FIG. 7 is a plan view illustrating the loading condition of the normal-type disc magazine, which has already been in the unlocking state, into the disc changer.
Figure 8:
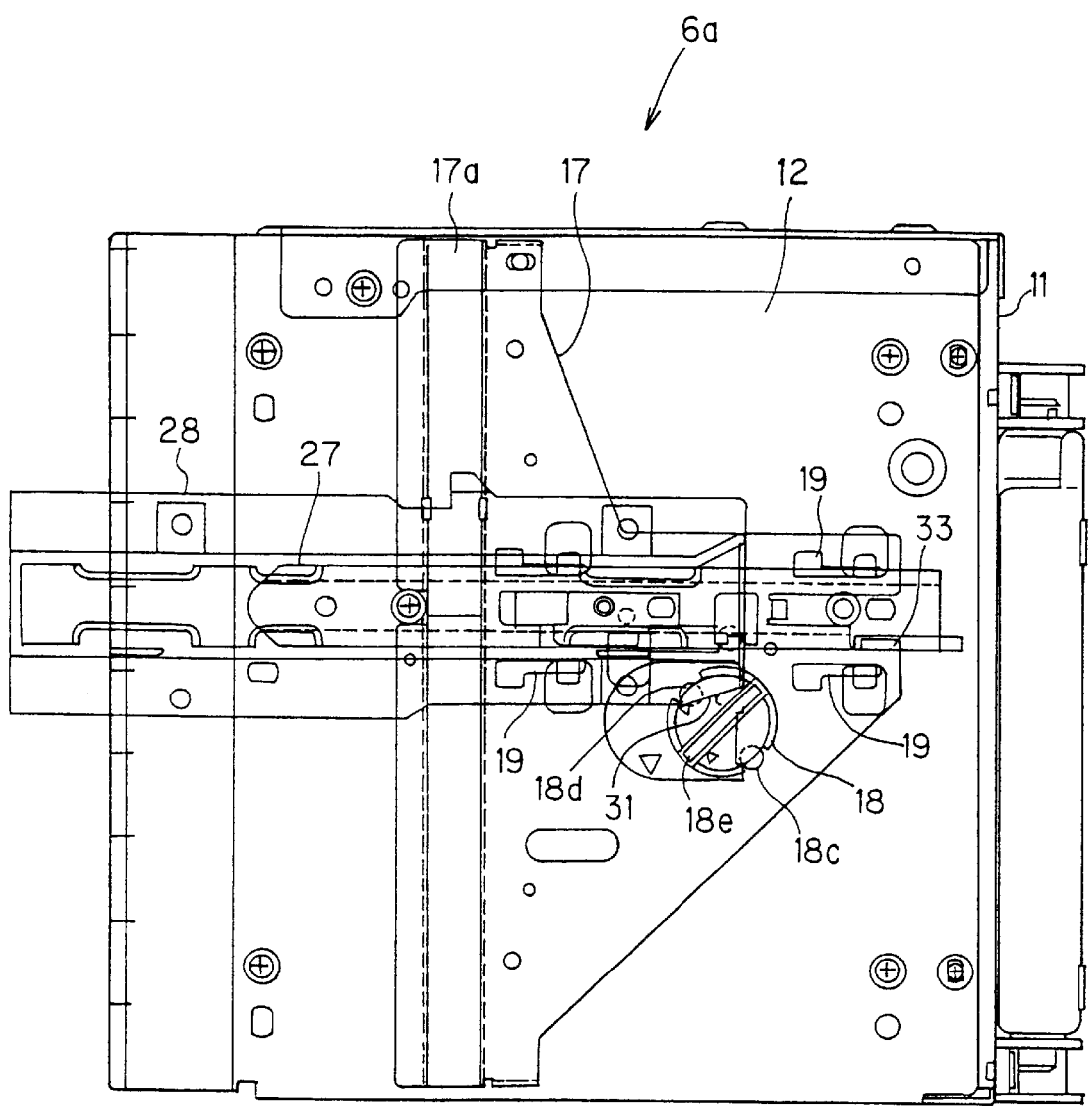
FIG. 8 is a front view of the disc magazine as shown in FIG. 7.

The guide rail 28 corresponding to the side wall 12 locating on the release knob 18 side has an inclined cam portion 31 formed thereon as shown in FIGS. 7, 8 and 18, which can come into contact with the elongated projection 18e of the release knob 18, which is in the unlocking state when the normal type-disc magazine 6a is loaded into the disc changer, so as to return the release knob 18 to the locking position. The release knob 18 that is returned to the locking position by means of the cam portion 31 is put in the locking state even when the disc magazine 6a is unloaded from the disc changer. It is however necessary to put the locking device in the unlocking state when the disc magazine 6a is loaded into the disc changer. Accordingly, a projection 32 is formed at the end of the guide rail 28, which locates on the inlet side of the disc changer, and a projecting piece 33 that can strike on the projection 32 from the above-mentioned inlet side is formed on the locking member 17, as shown in FIGS. 9, 10, 16 and 18, so as to permit to separate the locking member 17 from the abutting piece 15a of the disc holder 15 to maintain the unlocking state even when the release knob 18 is put in the locking position.

The operation of the normal-type disc magazine 6a having the above-mentioned construction will be described below in some cases.

(1) In the case where the disc magazine 6a is put in the locking state outside the disc changer The disc magazine 6a is put in the locking state as shown in FIGS. 3 and 4 after it is unloaded from the disc changer. In the locking state, the locking member 17 is always pressed in the locking direction (i.e., the left-hand direction in FIGS. 3 and 4) under the function of the resilient force given by the spring 26. Consequently, the projection portion 17a of the locking member 17 prevents the disc holder 15 from being deformed, thus making it impossible to remove the disc 1 from the rack groove 14a of the disc rack 14.

When the release knob 18 of the locking member 17 is put in the locking state, the disc magazine 6a can be loaded into the disc changer without bringing the release knob 18 into contact with the cam portion 31 of the guide rail 28.

Figure 9:
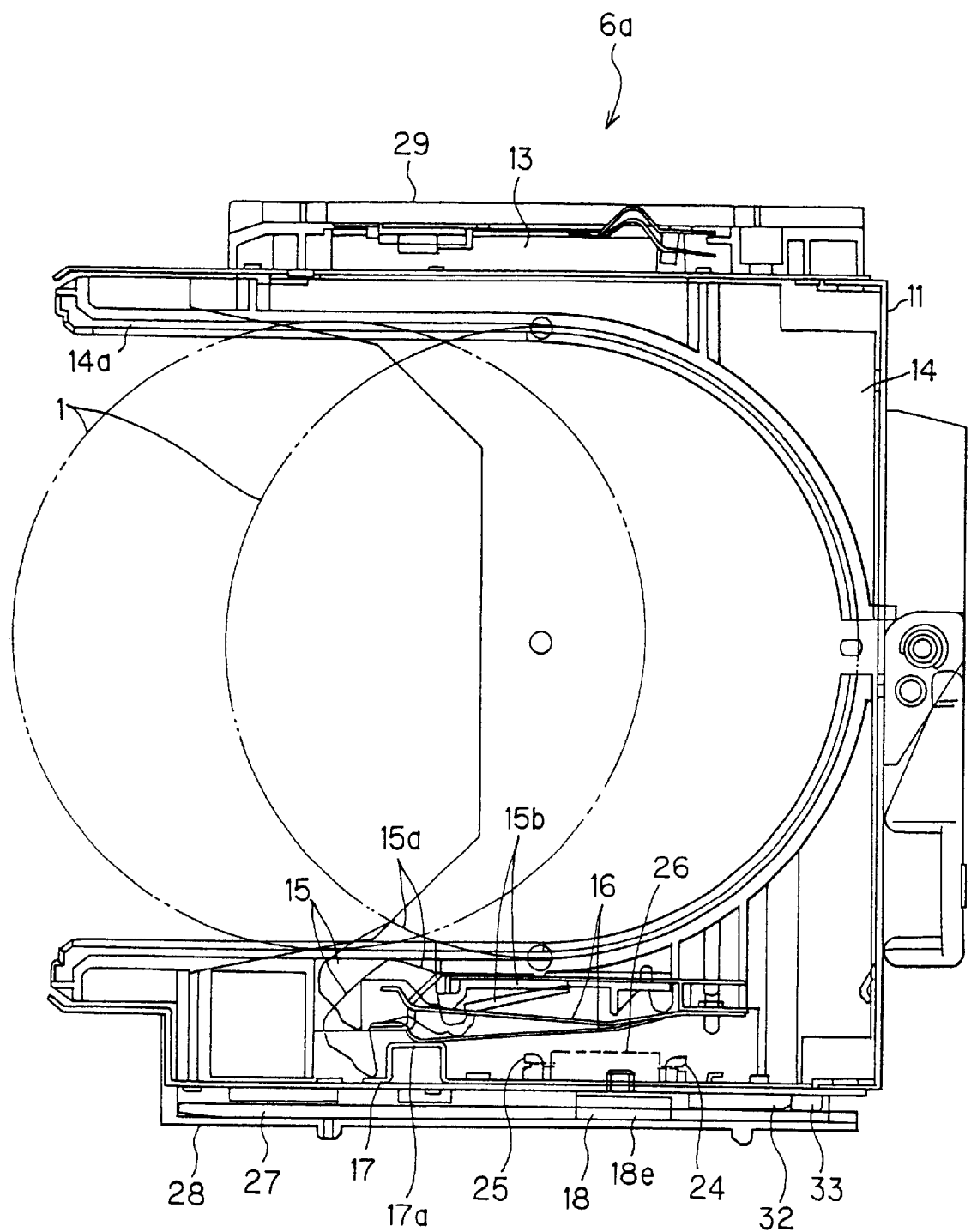
FIG. 9 is a plan view illustrating the completed loading condition of the normal-type disc magazine, which has already been in the unlocking state, into the disc changer.
Figure 10:
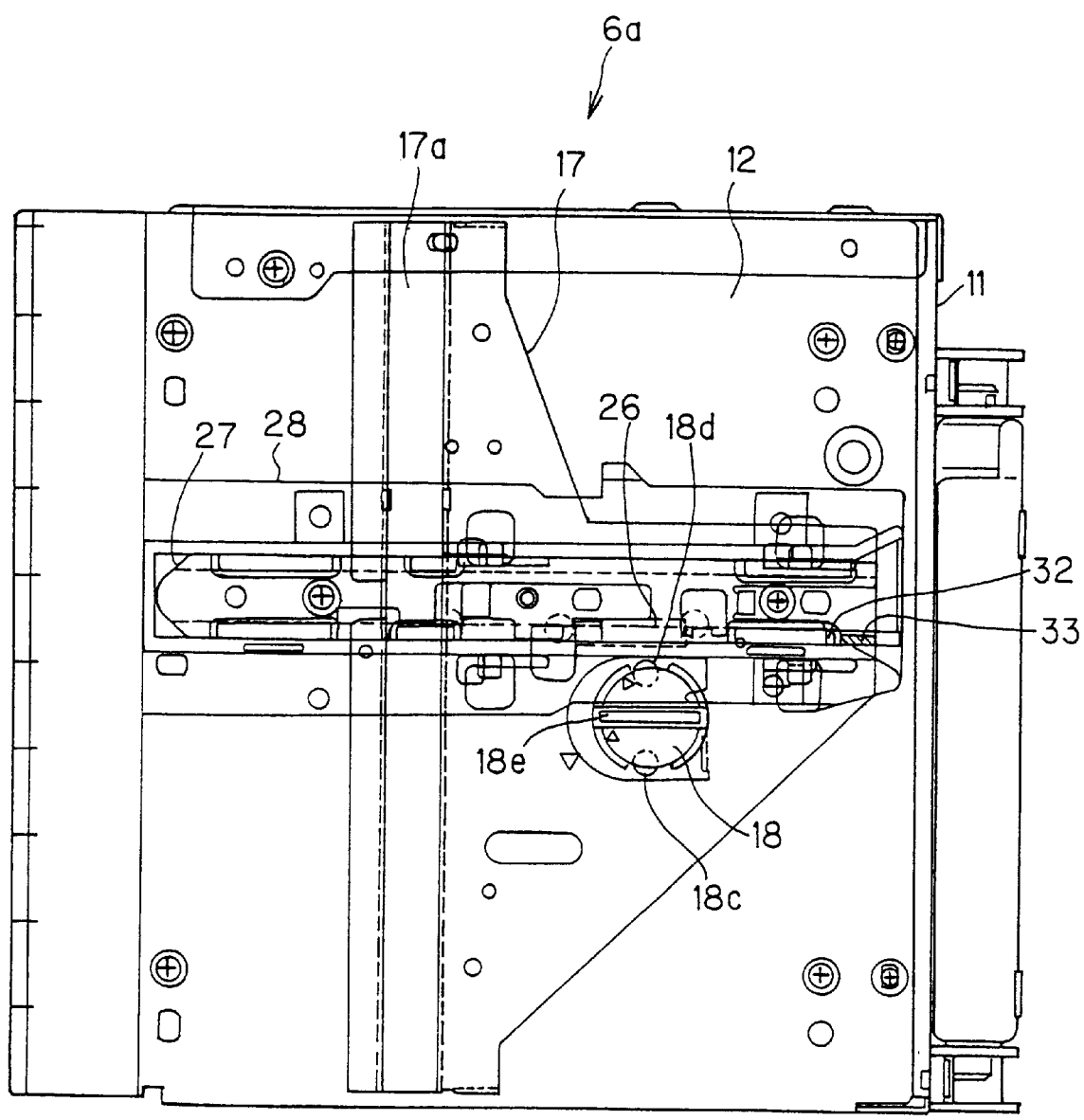
FIG. 10 is a front view of the disc magazine as shown in FIG. 9.

When the loading operation of the disc magazine 6a into the disc changer is completed as shown in FIGS. 9 and 10, the projection 32 of the guide rail 28 presses the projecting piece 33 of the locking member 17 so as to push it back. As a result, the locking member 17 moves in the unlocking direction (i.e., in the right-hand direction in FIGS. 9 and 10) against the resilient force of the spring 26.

The disc holder 15 can be deformed in the disc changer in this manner so that the disc 1 can be transferred.

(2) In the case where the disc magazine 6a is put in the unlocking state outside in the disc changer.

When the release knob 18 turns toward the unlocking direction as shown in FIGS. 5 and 6 outside the disc changer, the locking member 17 moves toward the unlocking direction (i.e., the right-hand direction in FIGS. 5 and 6) against the resilient force given by the spring 26. The release knob 18 is put in the unlocking state under the resilient force given by the spring 26, by which the locking member 17 is pulled. In such an unlocking state, the disc holder 15 can be deformed so that the disc 1 can be inserted into the disc magazine 6a or discharged therefrom.

When the release knob 18 turns toward the locking direction, the locking member 17 moves in the unlocking direction (i.e., in the left-hand direction in FIGS. 5 and 6) so as to prevent again the disc holder 15 from being deformed.

When the disc magazine 6a, which has been put in the unlocking state, is loaded into the disc changer, the cam portion 31 of the guide rail 28 presses the elongated projection 18e of the release knob 18 in the middle of the loading action to turn the release knob 18 in the locking direction. Consequently, when the disc magazine 6a is unloaded next from the disc changer, the release knob 18 is always put in the locking state.

When the loading operation of the disc magazine 6a into the disc changer is completed, the projection 32 of the guide rail 28 presses the projecting piece 33 of the locking member 17 so as to push it back, as shown in FIGS. 9 and 10. As a result, the locking member 17 moves in the unlocking direction (i.e., in the right-hand direction in FIGS. 9 and 10) against the resilient force of the spring 26.

The disc holder 15 can be deformed in the disc changer in this manner so that the disc 1 can be transferred.

Then, description of the lock-type disc magazine 6b will be given with reference to FIGS. 11–14, 19 and 20.

The locking device provided in the lock-type disc magazine 6b has a locking member 17 disposed on the inner surface of the one side-wall 12 and a lock arm 34 supported on the locking member 17, but has no components corresponding to the release knob 18 of the normal-type disc magazine 6a.

The locking member 17 is formed of a plate-shaped material as shown in FIG. 16 in the same manner as in the normal-type disc magazine 6a. However, the lock arm 34 is supported in a recess portion formed on the surface of the locking member 17, which is opposite to a projection portion 17a.

Figure 19:
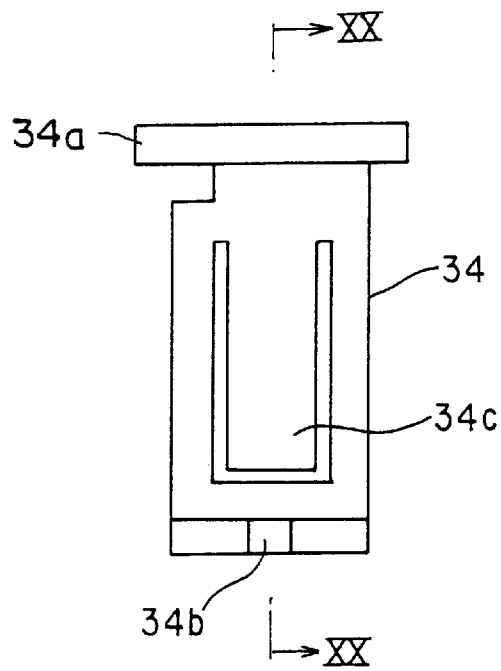
FIG. 19 is a front view of a lock arm of the lock-type disc magazine.
Figure 20:
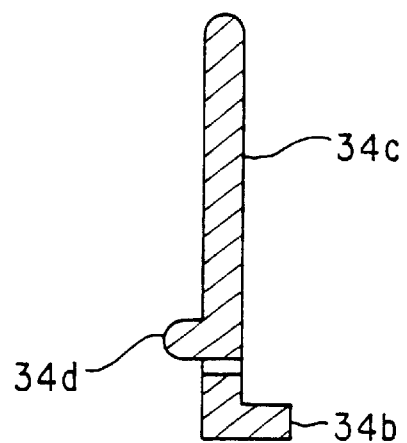
FIG. 20 is a cross-sectional view cut along the line XX—XX in FIG. 19.

The lock arm 34 has at its upper end a horizontal shaft 34a as shown in FIGS. 19 and 20. The lock arm 34 has a plate-shaped member extending downward from the horizontal shaft 34a. A projecting piece 34b projects from the lower end of the above-mentioned plate-shaped member. The plate-shaped member has a leaf spring portion 34c formed therein. A projection 34d projects from the lower end of the leaf spring portion 34c in the opposite direction to the projecting piece 34b. The rock arm 34 is supported behind the projection portion 17a of the locking member 17 by inserting the horizontal shaft 34a into shaft holes 17b formed on the rocking member 17 as shown in FIG. 16. The projection 34d of the leaf spring portion 34c comes into contact with the back surface of the projection portion 17a so that the projecting pieces 34b resiliently engages with a through-hole 35 formed on the side wall 12 as shown in FIG. 15. Consequently, when the disc magazine 6b is unloaded from the disc changer as shown in FIGS. 11 and 12, the locking member 17 is always put in the locking state.

When the disc magazine 6b is loaded into the disc changer, it is necessary to put the locking device in the unlocking state, and more specifically, to separate the locking member 17 from the abutting piece 15a of the disc holder 15 to maintain the unlocking state. Accordingly, the front end of the above-mentioned projecting piece 34b projects from the through-hole 35 into a groove 27a of the slider 27. A projection portion 36 is formed on the guide rail 28, which corresponds to the above-mentioned slider 27 and locates in the inside of the disc changer, as shown in FIG. 18. The projection portion 36 can come into contact with the projecting piece 34b of the lock arm 34 to separate the projecting piece 34b from the through-hole 35 when the disc magazine 6b is loaded into the disc changer. A projection 32 is formed at the end of the guide rail 28, which locates on the inlet side of the disc changer, and a projecting piece 33 that can strike on the projection 32 from the above-mentioned inlet side is formed on the locking member 17, as shown in FIGS. 11 to 14.

The operation of the lock-type disc magazine 6b having the above-mentioned construction will be described below.

Figure 11:
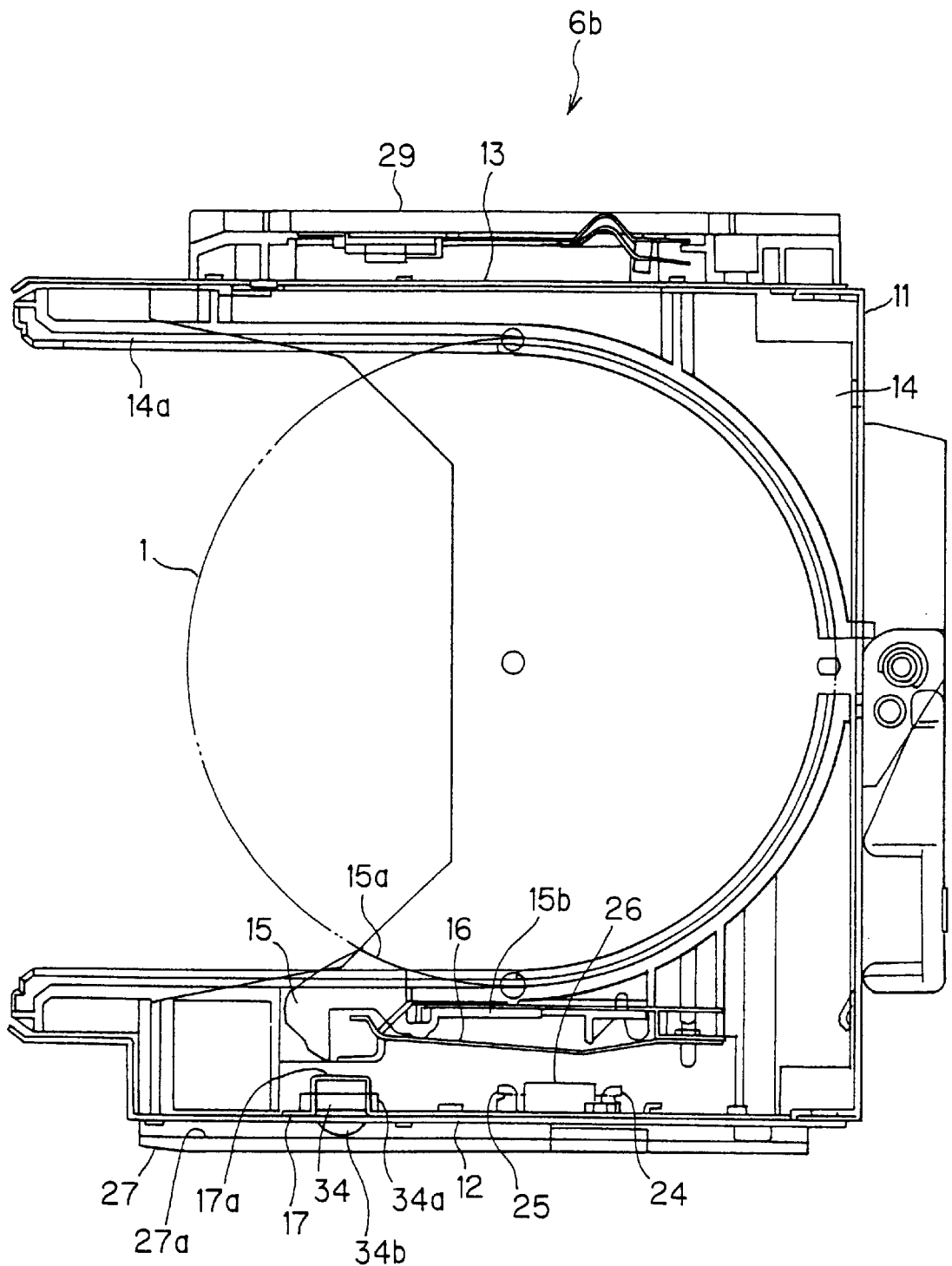
FIG. 11 is a plan view illustrating a lock-type disc magazine, which is in the locking state outside the disc changer.
Figure 12:
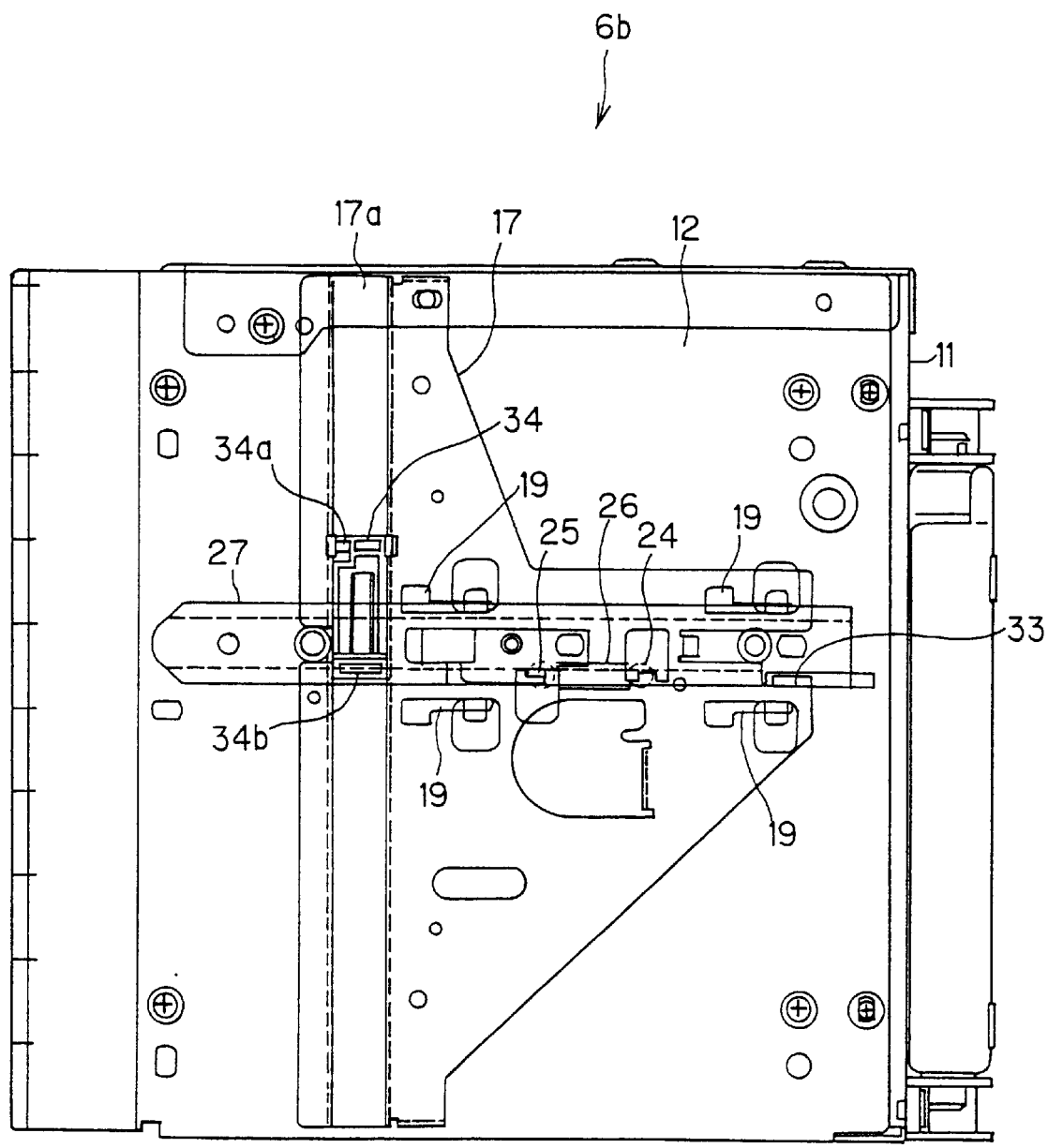
FIG. 12 is a front view of the disc magazine as shown in FIG. 11.

The disc magazine 6b is put in the locking state outside the disc changer as shown in FIGS. 11 and 12.

In the locking state, the locking member 17 is always pressed in the locking direction (i.e., the left-hand direction in FIGS. 11 and 12) under the function of the resilient force given by the spring 26. The projecting piece 34b of the lock arm 34 on the locking member 17 is fitted into the through-hole 35 formed on the side wall 12 of the housing so that the locking member 17 cannot move, even if an attempt to move the locking member 17 in the unlocking direction (i.e., the right-hand direction in FIGS. 11 and 12) is made. Accordingly, the projection portion 17a of the locking member 17 prevents the disc holder 15 from being deformed with the result that the disc 1 cannot be removed from the rack groove 14a of the disc rack 14.

Figure 13:
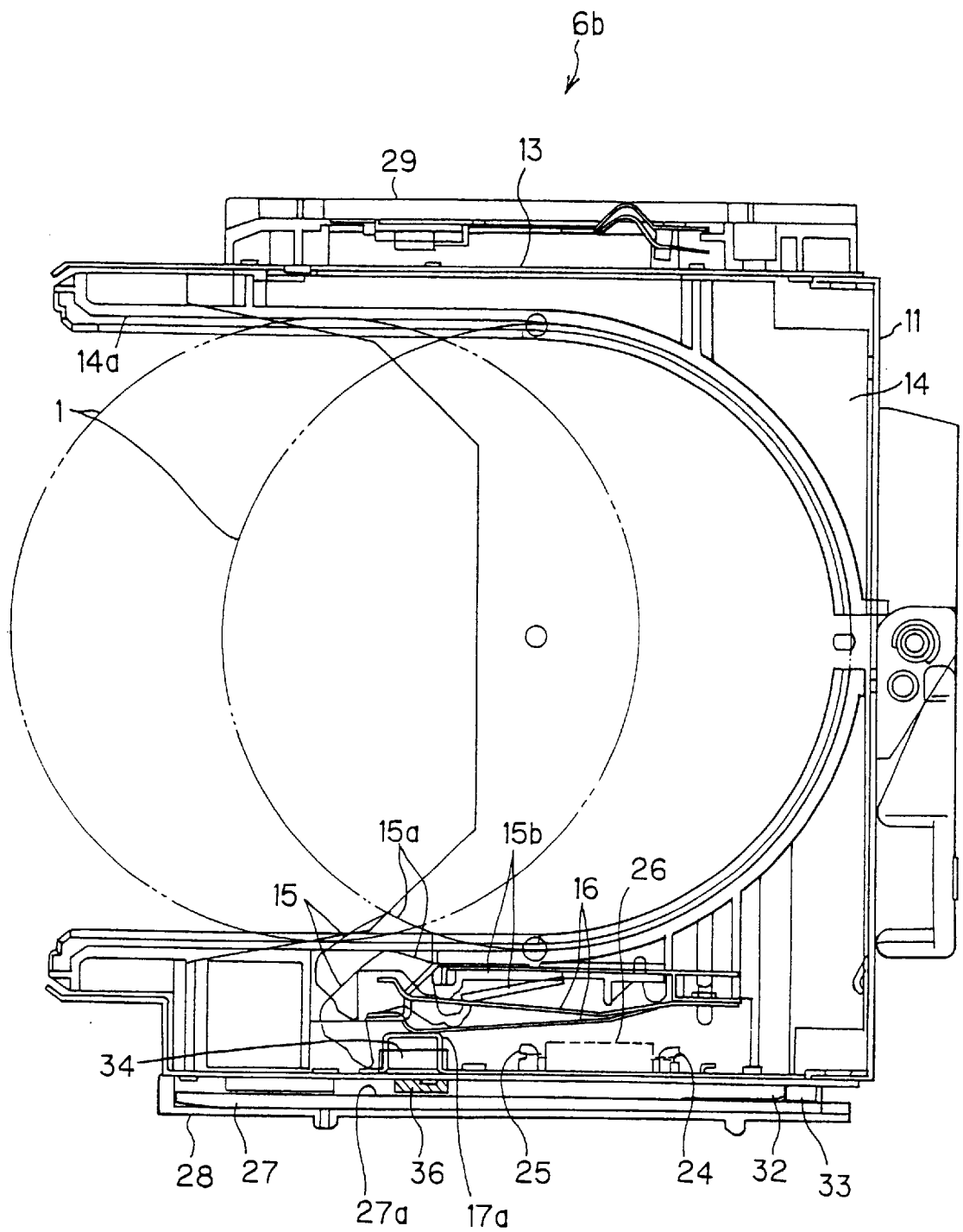
FIG. 13 is a plan view illustrating the lock-type disc magazine, which is loaded into the disc changer and in the unlocking state.
Figure 14:
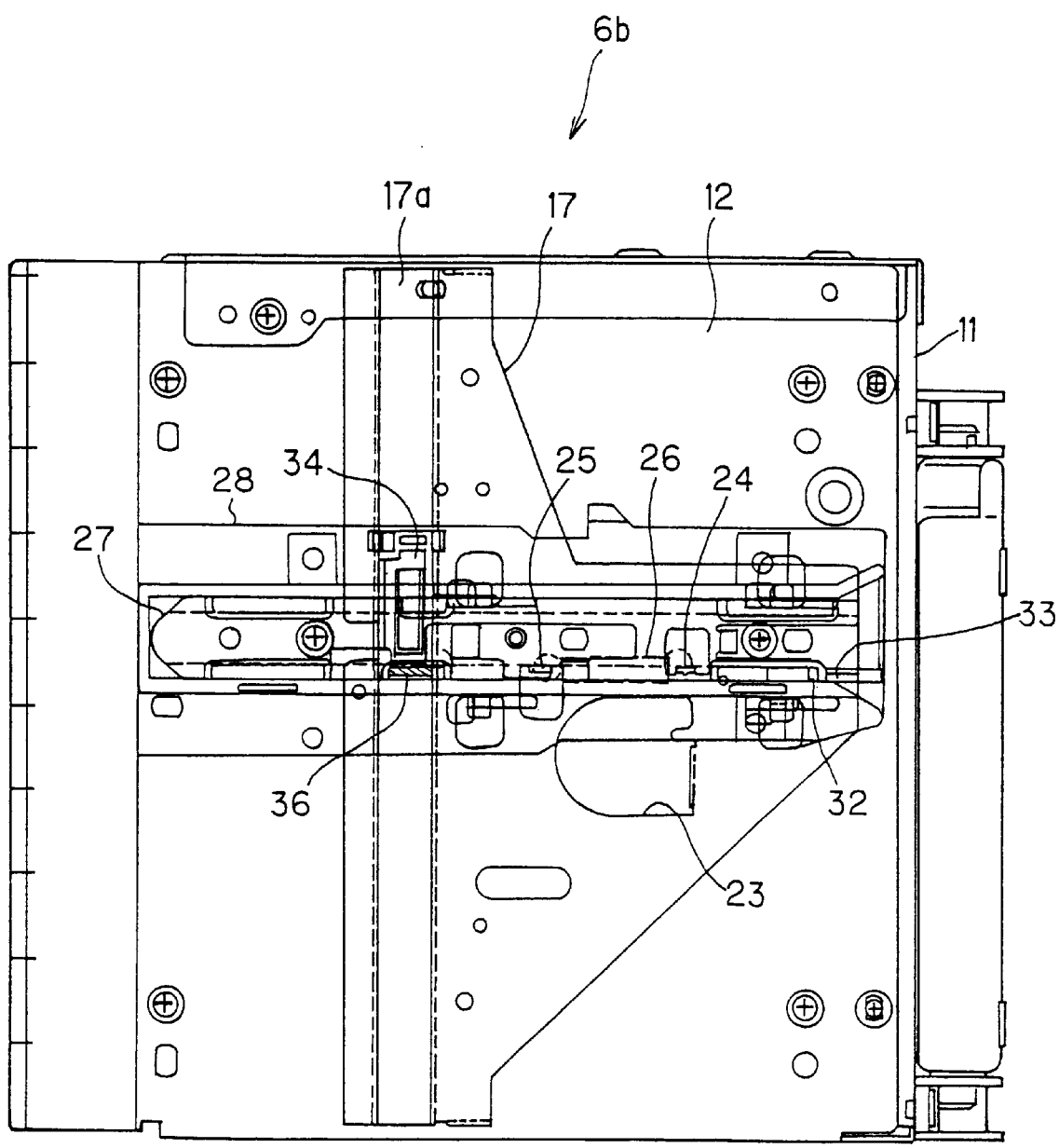
FIG. 14 is a front view of the disc magazine as shown in FIG. 13.

When the loading operation of the disc magazine 6b into the disc changer is completed as shown in FIGS. 13 and 14, the projection portion 36 of the guide rail 28 pushes the projecting piece 34b of the lock arm 34 back to the outside of the through-hole 35 to release the fitting of the projecting piece 34b into the through-hole 35 of the side wall 12. In addition, the projection 32 of the guide rail 28 presses the projecting piece 33 of the locking member 17 so as to push it back. As a result, the locking member 17 moves in the unlocking direction (i.e., in the right-hand direction in FIGS. 13 and 14) against the resilient force of the spring 26.

The disc holder 15 can be deformed in the disc changer in this manner so that the disc 1 can be transferred.

The systematization for the disc changer having the above-described structure is achieved by connecting it to an external host computer 37 as shown in FIG. 21.

The disc changer has the first device for identifying the type and the identification number of the disc magazines 6a, 6b, the second device for detecting the existence of the disc 1 in the disc magazines 6a, 6b, the third device for reading information recorded on the disc 1, which is stored in the disc magazines 6a, 6b and the fourth device for storing a data table, which includes the information on the type and the identification number of the disc magazines 6a, 6b and on the existence of the disc 1 in the disc magazines 6a, 6b. More specifically, the disc changer has a control unit 38, a memory 39, an operation unit 40, an interface 41 for connecting the disc changer to a host computer 37, and the like, in addition to a hyper magazine 8, which can lodge twenty discs and can be inserted into the single slot 2 (see FIG. 1), disc magazines 6a, 6b, which can lodge fifty discs and can be inserted into the slots 4 (see FIG. 1), disc driving devices 7.

The control unit 38 forms the first device for identifying the type and the identification number of the disc magazines 6a, 6b. In addition, the control unit 38 can control the relevant components to the mail slot 3 and achieve a setup operation for the disc changer in a manner described below. More specifically, the control unit 38 reads a data through a magazine interface from a memory 42, which is provided in each of the 20 disc storable-disc magazine 8 and the 50 disc storable-disc magazines 6a, 6b and is formed for example of an EEPROM (electrically erasable/programmable read only memory), to form a data table that includes the identification numbers of the disc magazines 6a, 6b, the types thereof, the existence of the disc 1 (see FIG. 3) and the other information and store the same in the other memory 39. The above-mentioned memory 39 serves as the fourth device for storing the data table, which includes the information on the type and the identification number of the disc magazines 6a, 6b and on the existence of the disc 1 in the disc magazines 6a, 6b.

The control unit 38 identifies the disc driving devices 7 through a drive interface and controls a disc transferring device (not shown) for transferring the disc 1 from the disc magazines 8, 6a, 6b to the disc driving devices 7.

The disc driving devices 7 serve as the third device for reading the information recorded on the disc 1, which is stored in the disc magazines 6a, 6b. The disc driving devices 7 are composed of a DVD-R (digital video disc-recordable) driver described later. The disc driving devices 7 also serves as the second device for detecting the existence of the disc 1 in the disc magazines 6a, 6b. The detection of existence of the disc 1 in the disc magazines 6a, 6b can be carried out for example by detecting the disc 1 with the use of a pickup 44 described later when reproducing the disc 1.

The above-mentioned disc transferring device (not shown) may be used as the second device for detecting the existence of the disc 1 in the disc magazines 6a, 6b. In this case, the detection of existence of the disc 1 in the disc magazines 6a, 6b can be carried out on the basis of a step for identifying the existence of the disc 1 by the disc transferring device.

The memory 42 composes the first device for identifying the type and the identification number of the disc magazines 6a, 6b, in cooperation with the above-described control unit 38. The memory 42 is formed of for example of the EEPROM. It is possible to electrically erase, write and read information in the EEPROM. There is known a memory element developed recently in which the EEPROM is received in a button-shaped package and the reading and writing a data can be performed merely by connecting the external two lines, i.e., the ground line and the data line to the element. The above-mentioned memory element is provided in the disc magazine in a manner as described below. More specifically, the memory element is provided in the disc magazine so that a pair of conductive portions formed at the slot of the disc changer can come into contact with a pair of terminals (i.e., the ground terminal and the data terminal) of the memory element provided in the disc magazine, respectively. The control unit 38 reads the identification number of the disc magazine from the memory element provided therein through the magazine interface. More specifically, the control unit 38 makes sequential connections of the two lines (i.e., the ground line and the data line) with the respective two conductive portions provided in the respective slots so as to read the identification number from the memory element provided in the disc magazine.

The identification number is previously (when for example manufacturing the disc magazine) recorded in the form of a data in the memory element of the disc magazine. The disc magazines have their individual identification numbers and the same identification number is not allotted to the other disc magazine.

The control unit 38 and the respective disc driving devices 7 in the disc changer are connected to the external host computer 37 through the interface, which is designed for example for a SCSI (small computer system interface).

The disc changer is controlled by the host computer 37. The processing of the data table of the respective disc magazines 8, 6a, 6b, which has been formed by the setup operation of the disc changer, on the one hand, and the information data read from the disc 1, on the other hand is performed under the control of the host computer 37.

With respect to the system for the disc changer, it is necessary to assemble, prior to the start of the system, a data base relative to all the discs 1 . . . 1 stored in all the disc magazines 8, 6a, 6b, which are loaded in the disc changer. This operation will be hereinafter referred to as the "system setup". The system setup is divided into the setup for the disc changer and the setup for the host computer in view of the contents of the processing operation.

Figure 22:
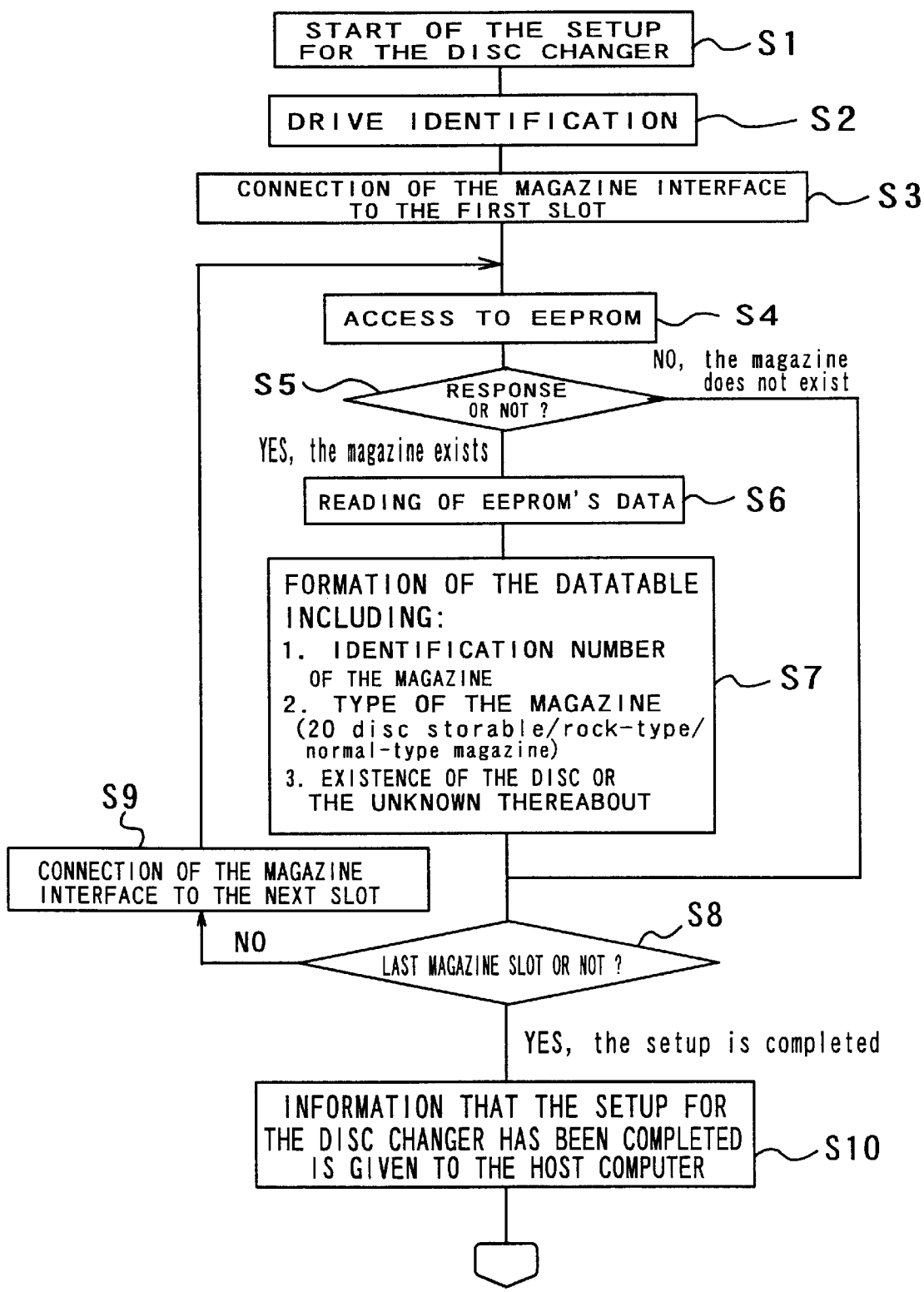
FIG. 22 is a flow chart illustrating procedures for setting up the disc changer.

Now, the setup for the disc changer will be described with reference to FIGS. 21 and 22.

The control unit 38 of the disc changer starts the setup for the disc changer in accordance with instructions from the operation unit 40 (Step S1).

Drive identification is carried out to identify the kinds of the disc driving devices 7 installed in the disc changer (Step S2). Then, the disc magazine interface is connected to the first slot of a plurality of slots 2, 3, 4 (Step S3).

Access to the memory 42 of the EEPROM is made (Step S4). A response to the access makes it possible to determine whether or not the disc magazines 8, 6a and/or 6b are loaded into the slots 2, 3 and/or 4, respectively (Step S5). When there is a response, i.e., the disc magazines 8, 6a and/or 6b are loaded into the slots 2, 3 or 4, respectively, the reading step of the data from the memory 42 of the EEPROM is carried out (Step S6). On the basis of the above-mentioned data, there is formed a data table DT, which includes information on the identification numbers of the disc magazines 8, 6a and/or 6b, on the type of the disc magazines 6a and/or 6b, on the existence of the disc 1 or the unknown thereabout in the respective disc rack 14 of the disc magazines 8, 6a and/or 6b and the like (Step S7).

All the above-described steps are carried out for each of the slots 2, 3 and 4. After the completion of formation of the data table for all the loaded disc magazines 8, 6a and/or 6b (Steps S8 and S9), information that the setup operation for the disc changer has been completed is given to the host computer 37 (Step S10).

Figure 23:
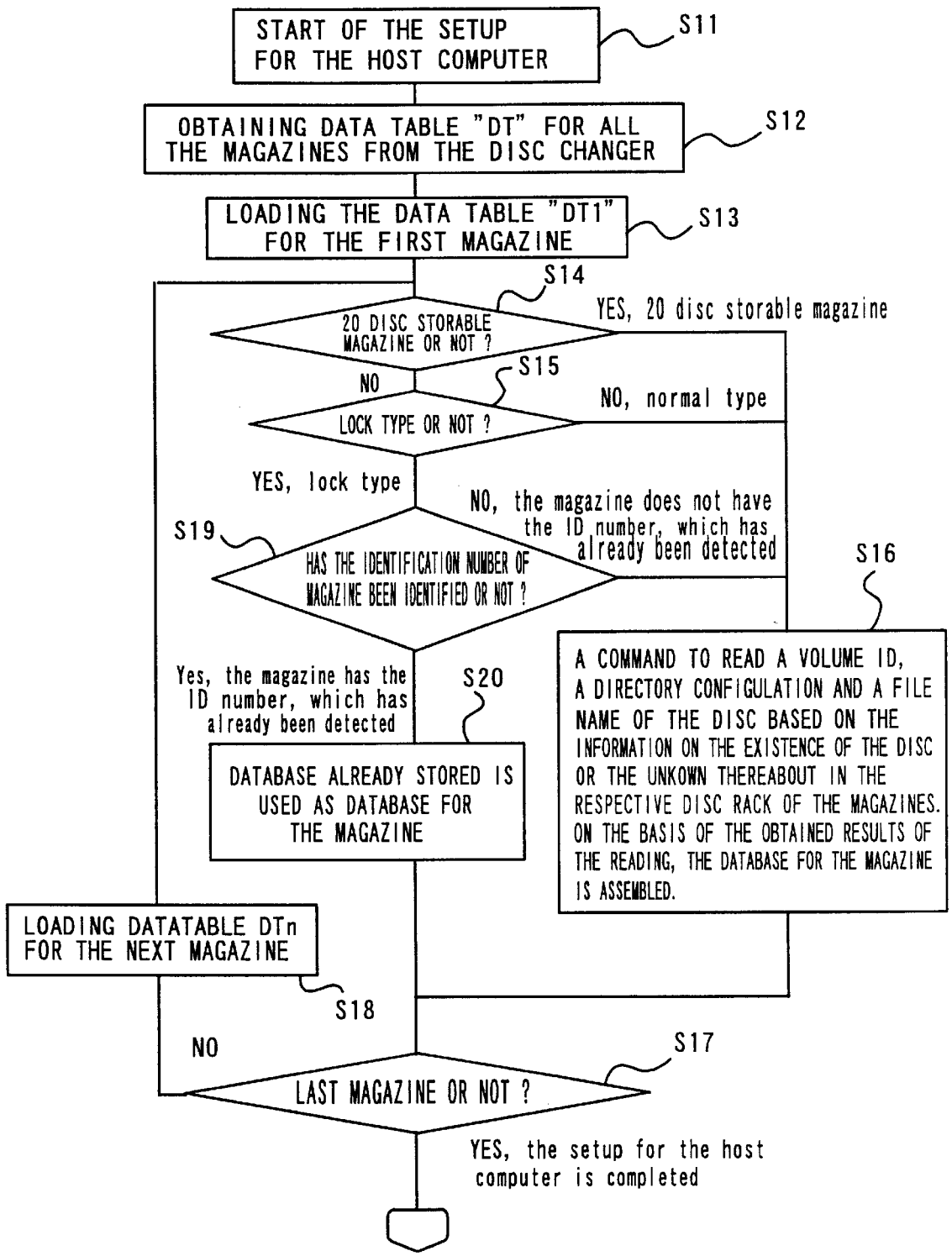
FIG. 23 is a flow chart illustrating procedures for setting up a host computer.

Now, the setup for the host computer will be described with reference to FIGS. 21 and 23.

When the host computer 37 receive the information from the disc changer that the setup operation for the disc changer has been completed, it starts the setup operation for the host computer 37 (Step S11).

First, there is obtained from the disc changer the data table for all the loaded disc magazine 8, 6a and/or 6b, which has been formed by the setup operation for the disc changer (Step S12).

The type of the disc magazines 8, 6a and/or 6b is identified from the data table. There is given to the disc changer a command to read a volume ID, a directory configuration and a file name of the disc 1 on the basis of the information on the existence of the disc 1 or the unknown thereabout in the respective disc rack 14 of the disc magazines 8, 6a and/or 6b. On the basis of the obtained results of the reading, the database for the disc magazines 8, 6a and/or 6b is assembled. The above-mentioned step for assembling the database is carried out for each of all the loaded disc magazines 8, 6a and/or 6b, with the result that the database is assembled for all the discs 1 stored in the disc changer. The setup operation for the host computer is completed in this manner and accordingly the setup operation for the system for the disc changer is also completed (Steps S13, S14, S15, S16, S17, S18, S19 and S20).

When the disc magazine is identified as the lock-type disc magazine (Step S15) in Steps S13 to S20, there is identified whether the identification number of the above-mentioned disc magazine has already been detected once or not (Step S19) in view of the fact that all the disc magazines have their individual identification numbers, which are not identical with each other. When the disc magazine has the identification number, which has already been detected, the data base for that disc magazine as stored in the memory of the host computer 37 is used (Step S20). It is therefore possible to omit the step for transferring the disc 1 stored in the disc magazine to the disc driving device 7 to read the information recorded in the disc 1, thus remarkably reducing time required for the setup.

After the completion of the setup for the system for the disc changer and of assembly of the data base for all the stored discs 1 . . . 1, the disc driving device 7 starts to read the information recorded on the disc 1.

Description will be given below of the DVD-R driver exemplified as the disc driving device 7, which serves as an information recording and reproducing apparatus.

Figure 24:
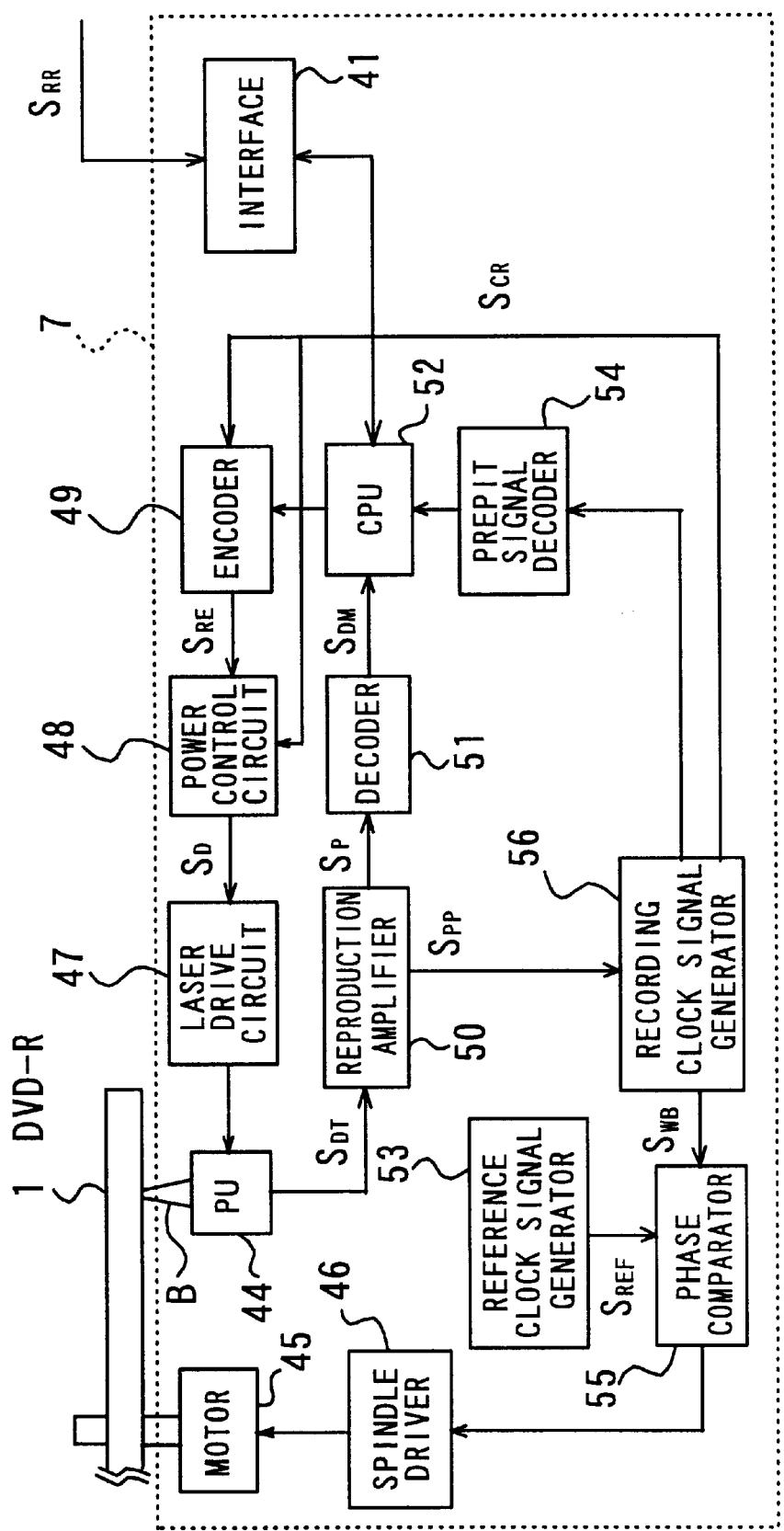
FIG. 24 is a block diagram illustrating a disc driving mechanism.

As shown in FIG. 24, the disc driving device 7 for the DVD-R disc 1 is composed of a pickup 44, a spindle motor 45, a spindle driver 46, a laser drive circuit 47, a power control circuit 48, an encoder 49, a reproduction amplifier 50, a decoder 51, a processor (CPU), a reference clock signal generator 53 for generating a base clock signal for the rotation control, a prepit signal decoder 54, a phase comparator 55 for generating a rotation control signal, a recording clock signal generator 56 and an interface 41 for interchanging data such as the recording information, the reproducing information and the like relative to the external host computer 37. The recording clock signal generator 56 is in general composed of a PLL (phase lock loop).

The operation of the DVD-R driver will be described below.

The pickup 44 includes a laser diode, a polarizing beam splitter, an objective lens, a photo detector, which are not shown in the figures, and the like. The pickup 44 irradiates, in its recording operation, a light beam B onto the information recording surface of the DVD-R 1 by an irradiation power, which varies in accordance with a laser drive signal that is supplied from the laser drive circuit 47 on the basis of the recording information data, to make a record of the recorded information data. The pickup 44 also irradiates, in its reading operation, the light beam B onto the DVD-R 1 by a prescribed irradiation power (i.e., a leading power). The photo detector receives a reflected light of the above-mentioned light beam B.

The pickup 44 causes the photo detector to receive a reflected light from the information-recording surface of the DVD-R 1, onto which the light beam B is irradiated. The pickup 44 converts the reflected light thus received into an electric signal, and in other words, generates a detection signal $S_{DT}$, which includes the recording information data and the other information by carrying out for example an arithmetic processing based on a radial push-pull system and outputs the resultant detection signal $S_{DT}$ to the reproduction amplifier 50.

The reproduction amplifier 50 amplifies the detection signal $S_{DT}$, which has been output from the pickup 44, outputs a pre-information signal $S_{PP}$, which includes a prepit signal and a wobble signal, to the recording clock signal generator 56, and outputs, in its reading operation, an amplification signal $S_{PP}$ corresponding to the information data, which has already been recorded, to the decoder 51.

The decoder 51 carries out an Eight-to-Sixteen demodulation processing and a deinterleaving processing relative to the input amplification signal $S_P$ to decode the amplification signal $S_P$ so as to generate a demodulation signal $S_{DM}$ and outputs the resultant demodulation signal $S_{DM}$ to the CPU 52.

The prepit signal decoder 54 decodes a pre-information, which includes an address information on the DVD-R 1 and outputs the resultant signal to the CPU 52.

The recording clock signal generator 56 outputs the recording clock signal $S_{CR}$ to the encoder 49 and the power control circuit 48.

The phase comparator 55 makes a phase comparison between the sampling wobble signal $S_{WB}$ input from the recording clock signal generator 56, on the one hand, and a reference clock signal $S_{REF}$, which is supplied from the reference clock signal generator 53 and includes a reference frequency component of the rotational velocity of the DVD-R 1, on the other hand, and supplies the resultant difference signal as the rotation control signal to the spindle motor 45 through the spindle driver 46. A spindle servo is constructed in this manner and the DVD-R 1 rotates in a prescribed number of rotation.

The interface 41 performs, under the control of the CPU 52, an interface operation for incorporating the recording information data $S_{RR}$, which is supplied from the host computer 37, into the information recording apparatus and supplied the above-mentioned recording information data $S_{RR}$ to the encoder 49. The interface 41 also has, in the reproduction operation, a function of supplying the recording information data of the disc 1 to the host computer 37.

The encoder 49 carries out an ECC (Error Correction Coding) processing, an Eight-to Sixteen demodulation processing and a scrambling processing, utilizing the recording clock signal $S_{CR}$ as a timing signal, generates a modulation signal $S_{RE}$ and outputs the resultant signal to the power control circuit 48.

The power control circuit 48 carries out the waveform shaping of the modulated signal $S_{RE}$ (so-called "light strategy processing") based on the recording clock signal $S_{CR}$ output from the clock signal generator 56 so as to enable the formation of appropriately shaped recording pits on the DVD-R 1, and outputs the resultant signal as the recording signal $S_D$ to the laser drive circuit 47.

The laser drive circuit 47 actually drives a laser diode (not shown) in the pickup 44 and outputs the laser drive signal for irradiating the light beam B by the irradiation power in accordance with the supplied recording signal $S_P$.

The CPU 52 obtains, in the recording operation, the address information from the pre-information, which is supplied from the prepit signal decoder 54, and controls the whole disc driving devices 7 so that the recording information data can be recorded on a position of the DVD-R 1, which corresponds to the above-mentioned address information. The CPU 52 obtains, in the reproduction operation, the recording information data recorded on the DVD-R 1 from the demodulation signal $S_{DM}$, and controls the whole disc driving devices 7 so that the thus obtained recording information data is output to the external host computer 37 through the interface 41.

According to the present invention as described in detail, a disc changer having at least one slot in which any one of different kinds of disc magazines can be stored, comprises: a first device for identifying a type and an identification number of said disc magazine; a second device for detecting existence of a disc in said disc magazine; a third device for reading information recorded on said disc, which is stored in said magazine; and a fourth device for storing a data table, which includes the information on the type and the identification number of said disc magazine and on the existence of said disc in said disc magazine. When the disc magazine loaded into the disc changer has a certain type, a setup operation is carried out. When the disc magazine loaded in the disc changer has the other type, which is different from the above-mentioned certain type, the data that has already been formed during the first setup operation of the disc magazine can however be used, thus permitting the omission of the setup operation in the disc changer in which the disc magazine is reloaded. It is therefore possible to reduce the required time in order to start the system operation to achieve a rapid setup operation for the system.

What is claimed is:

1. A disc changer having at least one slot for storing any one of different kinds of disc magazines, which comprises:

a first device for identifying a type and an identification number of said disc magazines;

a second device for detecting existence of a disc in each of said disc magazines;

a third device for reading information recorded on said disc, which is stored in each of said magazines; and a fourth device for storing a data table, which includes the information on the type and the identification number of said disc magazines and on the existence of said disc in each of said disc magazines, wherein, said first device comprises (1) a control unit being capable of achieving a setup operation for the disc changer and (2) a memory provided in each of said disc magazines, said second device and said third device comprise a plurality of disc driving devices for the disc in each of said disc magazines, said fourth device comprises a memory provided in the disc changer, and each of said disc driving devices comprises a pickup, a spindle motor, a spindle driver, a laser drive circuit, a power control circuit, an encoder, a reproduction amplifier, a decoder, a processor (CPU), a reference clock signal generator for generating a base clock signal for rotation control, a prepit signal decoder, a phase comparator for generating a rotation control signal, a recording clock signal generator and an interface for interchanging data relative to an external host computer.

2. The disc changer as claimed in claim 1, wherein:

said different kinds of disc magazines comprise a lock-type disc magazine in which the disc is non-lodgeable and non-dislodgeable outside the disc changer and a normal-type disc magazine in which the disc is lodgeable or dislodgeable outside the disc changer when the normal-type disc magazine is in an unlocking state.

3. The disc changer as claimed in claim 1, wherein:

said first device comprises (1) a control unit being capable of achieving a setup operation for the disc changer and (2) a memory provided in each of said disc magazines;

said third device comprises a plurality of disc driving devices for the disc in each of said disc magazines;

said second device comprises a disc transferring device for transferring the disc between said disc magazines and said disc driving devices; and said fourth device comprises a memory provided in the disc changer.

* * * * *